US010428171B2

(12) United States Patent
Cheng et al.

(10) Patent No.: US 10,428,171 B2
(45) Date of Patent: Oct. 1, 2019

(54) CYCLIC DYNAMIC POLYUREAS FOR POLYMERIC UREA PROCESSING

(71) Applicant: THE BOARD OF TRUSTEES OF THE UNIVERSITY OF ILLINOIS, Urbana, IL (US)

(72) Inventors: Jianjun Cheng, Champaign, IL (US); Hanze Ying, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 124 days.

(21) Appl. No.: 15/547,525

(22) PCT Filed: Feb. 3, 2016

(86) PCT No.: PCT/US2016/016267
§ 371 (c)(1),
(2) Date: Jul. 31, 2017

(87) PCT Pub. No.: WO2016/126756
PCT Pub. Date: Aug. 11, 2016

(65) Prior Publication Data
US 2018/0009933 A1   Jan. 11, 2018

Related U.S. Application Data

(60) Provisional application No. 62/111,572, filed on Feb. 3, 2015.

(51) Int. Cl.
| | | |
|---|---|---|
| *C08G 18/32* | (2006.01) | |
| *C08G 18/00* | (2006.01) | |
| *C08G 61/04* | (2006.01) | |
| *C09D 5/03* | (2006.01) | |
| *C09D 175/02* | (2006.01) | |
| *C08G 71/02* | (2006.01) | |
| *C08L 75/02* | (2006.01) | |
| *C08G 18/75* | (2006.01) | |
| *C08G 18/79* | (2006.01) | |

(52) U.S. Cl.
CPC ....... *C08G 18/3228* (2013.01); *C08G 18/325* (2013.01); *C08G 18/757* (2013.01); *C08G 18/792* (2013.01); *C08G 71/02* (2013.01); *C08L 75/02* (2013.01); *C09D 5/03* (2013.01); *C09D 175/02* (2013.01); *C08G 2150/20* (2013.01)

(58) Field of Classification Search
CPC .............. C08G 18/3228; C08G 18/325; C08G 18/792; C08G 2150/20; C08G 71/02; C08G 18/757; C09D 5/03; C09D 175/02; C08L 75/02
USPC .......................................... 528/68, 44; 520/1
See application file for complete search history.

(56) References Cited

U.S. PATENT DOCUMENTS

| | | |
|---|---|---|
| 4,197,353 A | 4/1980 | Tobias et al. |
| 5,367,654 A | 11/1994 | Furukawa et al. |
| 2007/0208157 A1 | 9/2007 | Posey et al. |
| 2011/0082274 A1* | 4/2011 | Hansen ............... C08G 18/324 528/53 |
| 2012/0295104 A1 | 11/2012 | Barker |
| 2014/0221567 A1 | 8/2014 | Fazel et al. |

FOREIGN PATENT DOCUMENTS

| | | |
|---|---|---|
| WO | 2011138432 A1 | 11/2011 |
| WO | 2014145539 A2 | 9/2014 |

OTHER PUBLICATIONS

Foti et al, Mass Spectrometric Detection of Cyclic Oligomers in Polyurethanes and Polyurea, 1982, Macromolecules, 15, 883-885 (Year: 1982).*
Ying et al, Dynamic urea bond for the design of reversible and self-healing polymers, Feb. 4, 2014, Nature Communications (Year: 2014).*
PCT International Search Report and Written Opinion dated May 31, 2016 from corresponding Application No. PCT/US2016/016267, 14 pages.
Ying, H. et al ., Hydrolyzable polyureas bearing hindered urea bonds, Journal of the American Chemical Society, 2014, vol. 136, No. 49, pp. 16974-16977.
Ying, H. et al., Dynamic urea bond for the design of reversible and self-healing polymers. Nature Communications, 2014. vol. 5, No. 3218, pp. 1-9.
Foti, S. et al., Mass spectrometric detection of cyclic oligomers in polyurethanes and polyureas, Macromolecules, 1982, vol. 15, No. 3, pp. 883-885.
Petros et al., Nat. Rev. Drug Discov. 2010, 9, 615-627.
Duncan, Nat. Rev. Cancer 2006, 6, 688-701.
Tong et al., J. Polymer Reviews 2007, 47, 345-381.
Yin et al., J. Polym. Chem. 2014, 5, 1581-1585.
Langer, R Science 1993, 260, 920-926.
Sun et al., Biomacromolecules 2011, 12, 1937-1955.
Annabi et al., Adv. Mater. 2014, 26, 85-124.
Wang et al., Nat. Biotechnol. 2002, 20, 602-606.

(Continued)

*Primary Examiner* — Jessica Whiteley
(74) *Attorney, Agent, or Firm* — Dilworth IP, LLC

(57) ABSTRACT

The present invention relates to a one-component processing method and system for preparing polyurea materials. This method and system involves a polymerization process using cyclic oligomeric polyurea precursors. These cyclic oligomeric precursors have dynamic urea bonds such as hindered urea bonds (HUBs). These cyclic oligomeric precursors exhibit dynamic properties to reversibly dissociate $_{in\ situ}$ yielding isocyanate and amine components which polymerize to yield the polyureas, such as linear, branched or cross-linked polyureas. This method and system has advantages over conventional methods that utilize two-component systems. Such two-component systems require the segregation of the isocyanate and amine components to prevent premature or too rapid polymerization. The resulting polyureas are useful for a variety of applications including coatings.

20 Claims, 17 Drawing Sheets

(56) References Cited

OTHER PUBLICATIONS

Lendlein et al., Science 2002, 296, 1673-1676.
Hwang et al., Science 2012, 337, 1640-1644.
Hwang et al., Adv. Mater. 2014, 26, 1992-2000.
Gross et al., Science 2002, 297, 803-807.
Tharanathan, Trends Food Sci. Technol. 2003, 14, 71-78.
Nampoothiri et al., Bioresour. Technol. 2010, 101, 8493-8501.
Tong et al., Angew. Chem. Int. Ed. 2008, 47, 4830-4834.
Yoshimoto et al., Biomaterials 2003, 24, 2077-2082.
Samarajeewa et al., J. Am. Chem. Soc. 2012, 134, 1235-1242.
Almutairi et al., J. Proc. Natl. Acad. Sci. USA 2009, 106, 685-690.
Yin et al., A. Adv. Mater. 2014, 26, 3879-3884.
Rutherglen et al., Macromolecules 2010, 43, 10297-10303.
Heller et al., Adv. Drug Del. Rev. 2002, 54, 1015-1039.
Du et al., Macromolecules 2010, 43, 2474-2483.
Binauld et al., Chem. Commun. 2013, 49, 2082-2102.
Liu et al., J. Am. Chem. Soc. 2010, 132, 1500-1501.
Shenoi et al., J. Am. Chem. Soc. 2012, 134, 14945-14957.
Zhang et al., ACS Macro Lett. 2014, 3, 693-697.
Broaders et al., Chem. Commun. 2011, 47, 665-667.
Garcia et al., Science 2014, 344, 732-735.
Fishman et al,. Angew. Chem. Int. Ed. 2013, 52, 5061-5064.
Kim et al., J. Controlled Release 2005, 103, 209-219.
Zhao et al., J. Am. Chem. Soc. 2010, 132, 13016-13025.
Xu et al., Macromolecules 2011, 44, 1327-1334.
Xiong et al., J. Am. Chem. Soc. 2012, 134, 4355-4362.
Zhang et al., . J. Am. Chem. Soc. 2012, 134, 18467-18474.
Deng et al., Adv. Funct. Mater. 2011, 21, 2641-2651.
Park et al., J. Controlled Release 2010, 147, 359-367.
Ajellal et al., Dalton Trans. 2010, 39, 8363-8376.
Grover et al., Can. J. Biochem. 1973, 51, 363-378.
Hutchby et al., Hindered ureas as masked isocyanates: facile carbamoylation of nucleophiles under neutral conditions. Angewandte Chemie International Edition, 2009, vol. 48. No. 46. pp. 8721-8724.
Wicks, Jr., et al., "Organic Coatings Science and Technology", 3rd Ed., Wiley, 2007, Chapter 28, pp. 548-573.

* cited by examiner

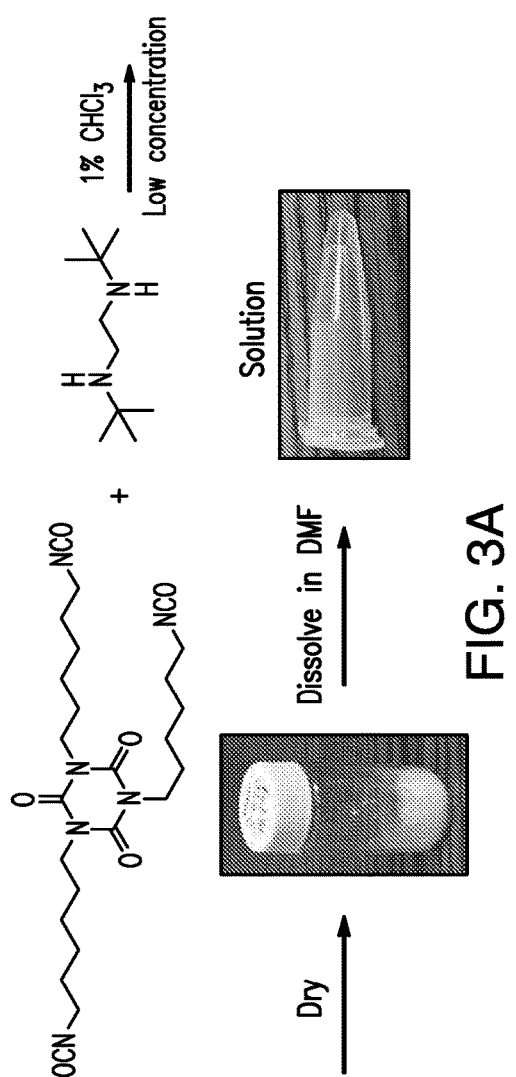
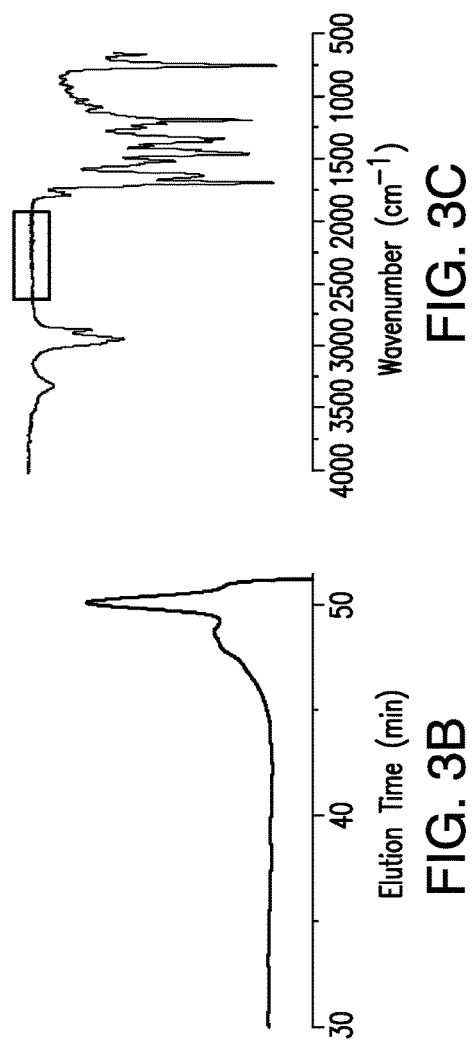
FIG. 3A
FIG. 3B
FIG. 3C

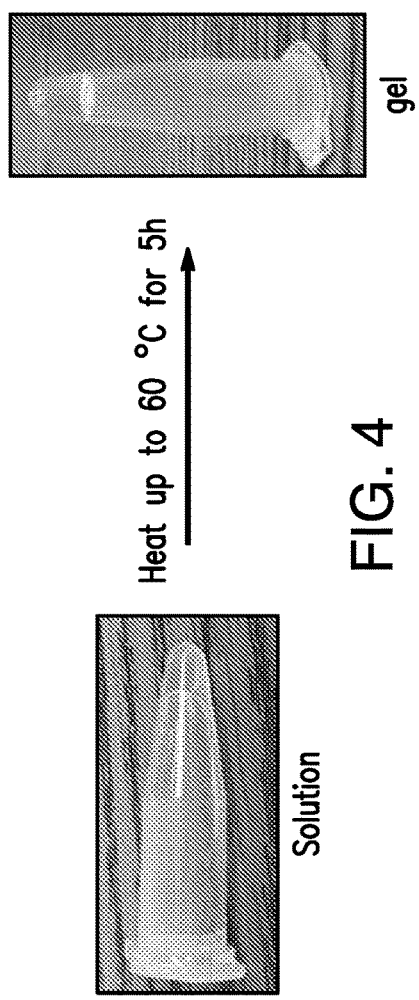
FIG. 4
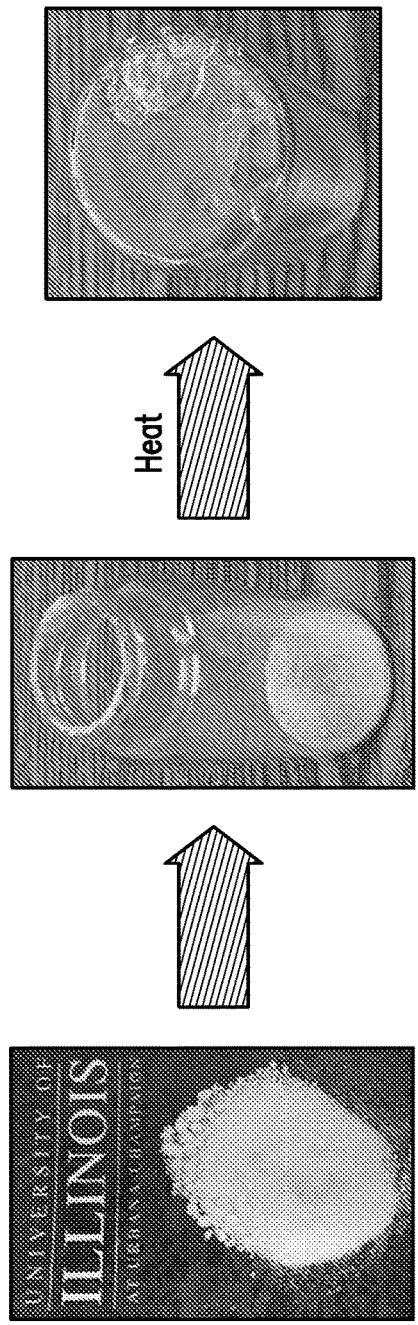
FIG. 5A
FIG. 5B
FIG. 5C

| | $K_{eq}\ (M^{-1})^a$ | $k_{-1}\ (h^{-1})^b$ | Water degradation $^c$ |
|---|---|---|---|
| 1 | $7.9 \times 10^5$ | 0.21 | 69% |
| 2 | $7.1 \times 10^4$ | 0.19 | 85% |
| 3 | $5.5 \times 10^5$ | 0.19 | 55% |
| 4 | $>1 \times 10^6$ | 0.008 | 4% |
| 5 | $>1 \times 10^8$ | <0.001 | 2% |

$^a$ tested at 20 °C; $^b$ tested at 37 °C; $^c$ water degradation was characterized by percentage of hydrolysis of 0.1 M solution in $v(d_6\text{-DMSO}){:}v(D_2O) = 5{:}1$ after 24 h at 37 °C

FIG. 7C

Cyclic oligomer 1

Cyclic oligomer 2

CYCLIC DYNAMIC POLYUREAS FOR POLYMERIC UREA PROCESSING

RELATED APPLICATION

This application claims priority to U.S. Provisional Patent Application Ser. No. 62/111,572 filed on Feb. 3, 2015, the disclosure of which is incorporated by reference herein in its entirety.

FEDERAL FUNDING LEGEND

This invention was made with government support under Grant No. CHE1153122 awarded by the National Science Foundation and the Director's New Innovator Award 1DP2OD007246-01 awarded by the National Institutes of Health. The government has certain rights in the invention.

FIELD OF THE INVENTION

The present invention relates to a one-component processing method and system for preparing polyurea materials. This method and system involves a polymerization process using cyclic oligomeric polyurea precursors. These cyclic oligomeric precursors have dynamic urea bonds such as hindered urea bonds (HUBs). These cyclic oligomeric precursors exhibit dynamic properties to reversibly dissociate in situ yielding isocyanate and amine components which polymerize to yield the polyureas, such as linear, branched or cross-linked polyureas. This method and system has advantages over conventional methods that utilize two-component systems. Such two-component systems require the segregation of the isocyanate and amine components to prevent premature or too rapid polymerization. The resulting polyureas are useful for a variety of applications including coatings.

BACKGROUND OF THE INVENTION

There is a need in the material and polymer sciences areas to develop polymeric materials with desired in-use performance characteristics that can be readily prepared. A particularly useful class of polymers are polyureas, including linear, branched or cross-linked polyureas. Because of their elastomeric, strength, and water-proof properties, polyureas are used in a wide range of applications, and particularly as coatings in various industrial and commercial applications. See for example, US Patent Application Publication No. 2014/0221567 A1, to Fazel et al., published Aug. 7, 2014; US Patent Application Publication No. 2012/0295104 A1, to Barker, published Nov. 22, 2014; and US Patent Application Publication No. 2011/0082274 A1, to Hansen et al., published Apr. 7, 2011; which are all incorporated by reference herein in their entirety.

Polyureas can be synthesized by combining multifunctional isocyanates and amines. The reaction is generally clean and efficient. The curing of polyureas can be very fast even at ambient conditions. However, too fast a reaction can cause processing difficulties, because cross-linking occurs before complete homogenization of the monomeric components. It is generally necessary to isolate the monomer components, which can require specialized apparatuses for the polyurea processing. For example, it is possible to use a two-nozzle spray to apply polyurea coatings, which can facilitate the mixing of the two monomer components during application. However, this method is wasteful and not user-friendly, because cumbersome personal protection equipment is needed to prevent the inhalation of toxic mists. For step-growth polymerization of polyureas, curing usually requires high monomer concentrations, because at low concentrations the mixing of multifunctional components usually yields only cyclic oligomers. However, in the present invention, we have taken advantage of this low concentration phenomenon in conjunction with certain dynamic bonds, such as hindered urea bonds (HUBs) to provide methods and systems for a facile, one-component system for making and curing polyureas.

Differing from polymers and oligomers formed with strong, irreversible covalent bonds and stable bulk properties, polymers prepared through reversible non-covalent interactions or covalent bonds exhibit various dynamic properties. The dynamic features of reversible polymers have been employed in the design of self-healing, shape-memory, and environmentally adaptive materials. However, non-covalent interactions are relatively weak, with only a few exceptions such as quadruple hydrogen bonding, high valence metal chelation, and host-guest molecular interactions. Dynamic covalent bonds, on the contrary usually have higher strength and more controllable reversibility.

The amide bond forms the basic structure of numerous biological and commodity polymers, for example nylon and polypeptides, and as such, is one of the most important organic functional groups. It has been hypothesized that the amide bond has relatively high stability due to conjugation effects between the lone electron pair on the nitrogen atom and the pi-electrons on the carbonyl p-orbital. Reversing the amide bond, i.e. amidolysis, usually requires extreme conditions, such as highly basic or acid conditions and/or high temperatures, or the presence of special reagents, such as catalysts and enzymes.

Introducing bulky substituents has been theorized to create steric hindrance to disturb the orbital co-planarity of the amide bond, which diminishes the conjugation effect and thus weakens the carbonyl-amine interaction. However, the dissociated intermediate from amidolysis, would be a ketene, and if formed would generally be too reactive to provide dynamic reversible formation of the amide bond. To make the carbonyl-amine structure reversible, it is required that the dissociated carbonyl structure be stable under ambient conditions but still highly reactive with amines. One such functional group that satisfies these requirements is the isocyanate group, which can be used to form urea linkages. Isocyanates are generally sufficiently stable under ambient conditions and can react with amines rapidly to form a urea bond, a reaction that has been broadly used in the synthesis of polyureas and poly(urethane-ureas). Therefore, it would be highly desirable to control the reversibility and the kinetics of these urea bonds in polymeric or oligomeric materials, particularly as precursors for conveniently preparing polyureas in a controlled manner from a one-component process or system.

Many currently available polymeric and oligomeric materials lack both the desired performance characteristics and dynamic properties, as it is difficult to achieve both these properties from conventional polymer technologies. For example, highly covalent cross-linked network polymers generally lack the ability to be recycled, processed and self-healed after cracks have developed. As another example, polyureas constitute an important class of polymers, however, conventional polyureas generally have a very stable bond, are not very soluble, and cannot be recycled and reshaped after polymerization.

See H. Ying et al, *Dynamic urea bond for the design of reversible and self-healing polymers*, J. Nature Communications, 5, 3218, published Feb. 5, 2014, and PCT Publication WO 2014/144539 A2, to The Board of Trustees of the University of Illinois, published Sep. 18, 2014, which are both incorporated by reference herein in their entirety.

As seen from the foregoing, it would be highly desirable to have improved polymers. It is apparent there is an ongoing need to develop new polymers that have both desired and controlled dynamic characteristics without compromising other in-use performance properties.

We have surprisingly found we can synthesize polyureas using a one-component process or system using cyclic polyurea oligomers having hindered urea bonds which can dynamically exchange with each other. With this chemistry, the size of the resultant polyureas can be dynamically tuned by concentration, which makes it possible to use cyclic oligomers as one-component precursors for cross-linked polyureas. Such a one-component process or system avoids the complexities and costs of two-component systems and the need to segregate the individual monomer components prior to polymerization.

BRIEF DESCRIPTION OF THE FIGURES

FIG. 1 depicts the concentration dependence of the molecular weight of linear polyureas.

FIG. 3 depicts the synthesis and characterization of cyclic oligomeric HUB precursors. FIG. 3A depicts the mixing of a multi-function isocyanate and a hindered amine (t-butyl substituted) in chloroform at low concentration, followed by pump drying to give a white crystalline material (as shown in the vial), which can be dissolved in dimethyl formamide at high concentration (as shown in the covered tube). FIG. 3B depicts the gel permeation chromatography demonstrating that the resulting white crystalline material has a relatively low molecular weight. FIG. 3C depicts the FTIR showing that the white crystalline material contains no detectable unreacted isocyanate group, as demonstrated by the absence of an isocyanate absorption band in the spectrum.

FIG. 4 depicts a further experiment for the curing of the one-component cyclic oligomeric HUB precursors to form cross-linked polymers. The white crystalline material obtained (as described in FIG. 3A) was dissolved in dimethyl formamide (33% w/w). The solution was incubated at 60° C. for 5 hours, after which the solution was observed to form a gel, demonstrating that the dynamic cross-linked polyurea can be cured from the one-component precursors.

FIG. 5 depicts a further experiment for making a polyurea powder coating by curing a solid oligomeric polyurea of the present invention. FIG. 5A shows the white crystalline material (as described in FIG. 3A). This solid was spread evenly in the bottom of a 20 mL via (FIG. 5B. After heating the bottom of the vial with a heat gun, a clear, glassy material was obtained in the bottom of the vial (FIG. 5C).

FIGS. 7A through 7D depict the dynamicity and hydrolytic degradation of HUB-containing model compounds: FIG. 7A: Parameters related to the hydrolytic degradation of HUBs; FIG. 7B: Structures of five HUB-containing model compounds; FIG. 7C Binding constants (Keq), dissociation rate (k−1) and water degradation kinetics of the five HUB-containing model compounds shown in FIG. 7B; and FIG. 7D: Representative NMR spectra showing the degradation of compound 3 of FIG. 7B. The percentage of hydrolysis was determined by the integral ratio of peaks corresponding to starting compounds and hydrolysis products as shown in the inset.

FIG. 8A: Shows the synthesis of four different types of pHUBs by mixing diisocyanates and diamines; FIG. 8B: Gas phase chromatography (GPC) curves showing water degradation of poly(6/9) and poly(7/9) in $H_2O/DMF=5:95$ after 24 hours incubation at 37° C.; and FIG. 8C: Not showing molecular weight reduction of the four polymers depicted in FIG. 8A in $H_2O/DMF=5:95$ for various incubation times at 37° C.

FIG. 9A: Triisocyanate and diamine cross-linked into an organogel in dimethylformamide (DMF) with the pre-addition of water; FIG. 9B: Synthesis of urea based cross-linked hydrophilic polymers G1, G2, and G3 by UV polymerization; FIG. 9C: Organogel synthesized from material of FIG. 9A collapsed into solution after 24 h incubation at 37° C. Weight change of G1, G2, and G3 after immersing in phosphate-buffered saline (PBS) for variant times.

FIG. 10A: The scheme for the synthesis of a dynamic polyurea in tetrahydrofuran (THF). FIG. 10B: Outlines the experimental procedures: The dynamic polyurea solution was made in 30% (weight ratio) concentration in THF, and separated into two batches. One batch was continuously heated at 60° C. for two days, and the other batch was diluted to 2% concentration, heated at 60° C. for one day, and then concentrated back to 30%, and heated at 60° C. for another day. FIG. 10C: Shows the GPC curves of dynamic polyurea solutions at three different stages: 30% solution heated at 60° C. for two days (fine solid line); 30% solution diluted to 2%, and heated at 60° C. for one day (dotted line); and 30% solution diluted to 2% and heated at 60° C. for one day and concentrated back to 30% and heated at 60° C. for another day (heavy solid line).

FIG. 11A outlines the general reaction scheme. FIG. 11B shows the $^1$H NMR (obtained on a Varian 500 MHz spectrometer) of a polymer mixture and of two cyclic oligomers separated via column chromatography. FIG. 11C shows the chemical structures for the cyclic oligomer 1 and cyclic oligomer 2.

SUMMARY OF THE INVENTION

Figure 1A:
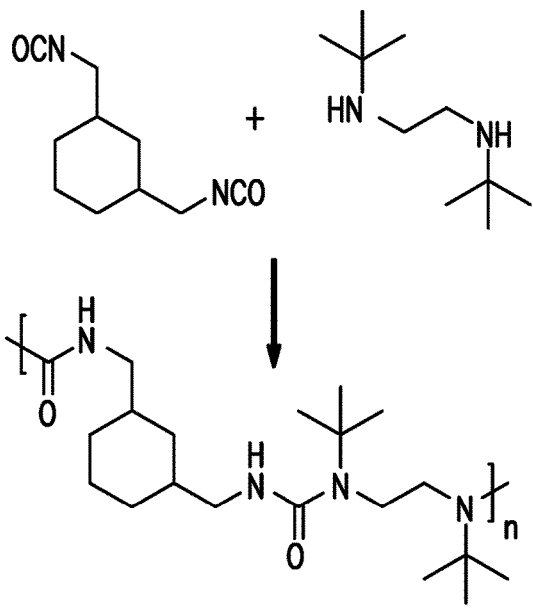
FIG. 1A depicts the synthesis of a linear polyurea with a hindered urea bond (HUB).

The present invention relates to a one-component processing method and system for preparing polyurea materials.

This method and system involves a polymerization process using cyclic oligomeric polyurea precursors. These cyclic oligomeric precursors have dynamic urea bonds such as hindered urea bonds (HUBs). These cyclic oligomeric precursors exhibit dynamic properties to reversibly dissociate in situ yielding isocyanate and amine components which polymerize to yield the polyureas, such as linear, branched or cross-linked polyureas. This method and system has advantages over conventional methods that utilize two-component systems. Such two-component systems require the segregation of the isocyanate and amine components to prevent premature or too rapid polymerization. The resulting polyureas are useful for a variety of applications including coatings.

DETAILED DESCRIPTION OF THE INVENTION

The present invention relates to a cyclic oligomer or polymer corresponding to formula (Ia) or (Ib)

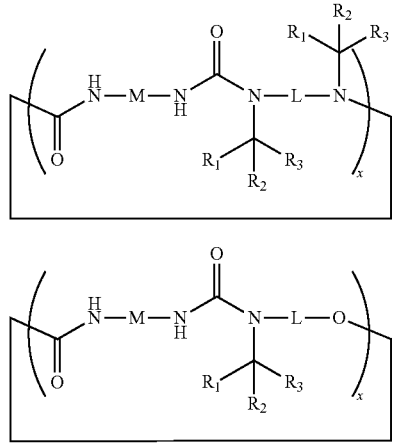

wherein L and M are independently selected from $(C_1-C_{100})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_1-C_{20})$alkyl$(C_6-C_{10})$aryl$(C_1-C_{20})$alkyl, $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —NR$_4$—, =N—, —C(R$_5$)$_2$—, —NC(=O)$(C_1-C_{20})$alkyl-, —C(=O)$(C_1-C_{20})$alkyl-, —C(=O)—(NR$_4$)—, —S(=O)$_2$O—, —S(=O)$_2$—$(C_1-C_{20})$alkyl-, —OS(=O)$_2$O$(C_1-C_{20})$alkyl-, —S(=O)$_2$NR$_4$—, —S(=O)$(C_1-C_{20})$alkyl-, —P(=O)(OR$_4$)O—, —C(S)—$(C_1-C_{20})$alkyl-, —C(O)O$(C_1-C_{20})$alkyl-, —C(=O)O—, —C(=S)O$(C_1-C_{20})$alkyl-, —C(=O)S$(C_1-C_{20})$alkyl-, —C(=S)S$(C_1-C_{20})$alkyl-, —C(O)NR$_4$—$(C_1-C_{20})$alkyl-, and —C(=NR$_4$)NR$_4$—;
each R$_1$, R$_2$, R$_3$ and R$_4$ are independently selected from the group consisting of aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;
each R$_5$ is independently selected from F, Cl, Br, and I;
and x is an integer from about 2 to about 500

In another aspect the present invention relates to a cyclic oligomer or polymer corresponding to formula (Ia).

In another aspect the present invention relates to a cyclic oligomer or polymer corresponding to formula (Ib).

In another aspect the present invention relates to a cyclic oligomer or polymer corresponding to formula (Ia) or (Ib) wherein R$_1$, R$_2$, and R$_3$ are each methyl.

In another aspect the present invention relates to a cyclic oligomer or polymer corresponding to formula (Ia) or (Ib) wherein M is

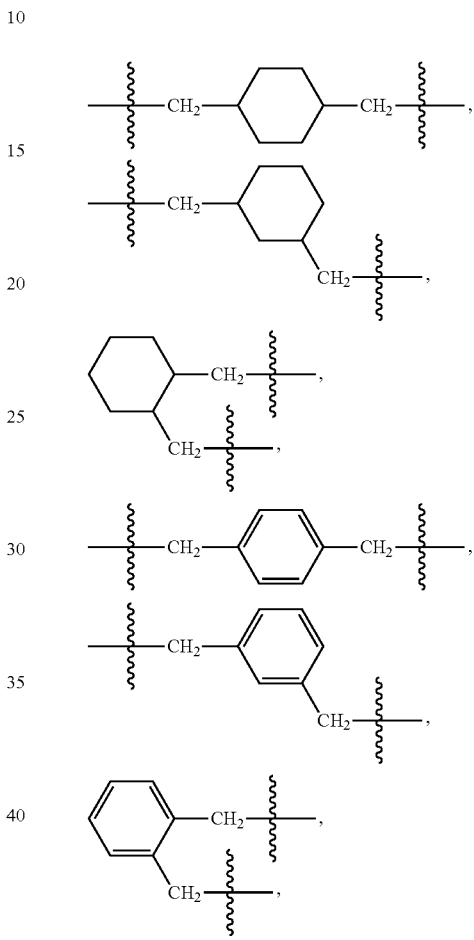

and
$(C_1-C_{100})$alkyl,
and L is —$(CH_2CH_2)$—.

In another aspect the present invention relates to a cyclic oligomer or polymer corresponding to formula (Ia) or (Ib) wherein x is an integer from about 2 to about 500.

In another aspect the present invention relates to a cyclic oligomer or polymer corresponding to formula (Ia) or (Ib) wherein x is an integer from about 2 to about 50.

In another aspect the present invention relates to a cyclic oligomer or polymer corresponding to formula (Ia) or (Ib) wherein x is an integer from about 2 to about 20.

In another aspect the present invention relates to a cyclic oligomer or polymer corresponding to formula (Ia) or (Ib) wherein x is an integer from about 2 to about 8.

In another aspect the present invention relates to a hyperbranched cyclic oligomer or polymer corresponding to formula (IIa) or (IIb)

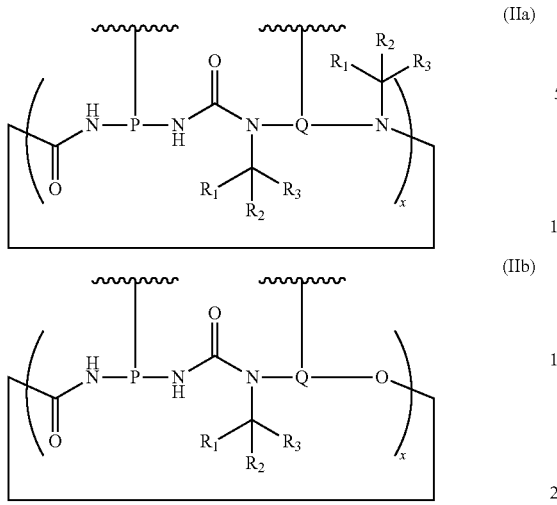

(IIa)

(IIb)

wherein P and Q are independently selected from functionalized branched linkers each having a total of two or more arms (attachment points), wherein at least one of P or Q has three or more arms (attachment points), selected from $(C_1-C_{100})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_1-C_{20})$alkyl$(C_6-C_{10})$aryl$(C_1-C_{20})$alkyl, $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —C$(R_5)_2$—, —NC(=O)$(C_1-C_{20})$alkyl-, —C(=O)$(C_1-C_{20})$alkyl-, —S(=O)$_2$—$(C_1-C_{20})$alkyl-, —OS(=O)$_2$O$(C_1-C_{20})$alkyl-, —S(=O)$(C_1-C_{20})$alkyl-, —C(S)—$(C_1-C_{20})$alkyl-, —C(O)O$(C_1-C_{20})$alkyl-, —C(=S)O$(C_1-C_{20})$alkyl-, —C(=O)S$(C_1-C_{20})$alkyl-, —C(=S)S$(C_1-C_{20})$alkyl-, —S(=O)$_2$NR$_4$—, —C(O)NR$_4$—$(C_1-C_{20})$alkyl-, —C(=NR$_4$)NR$_4$—, and

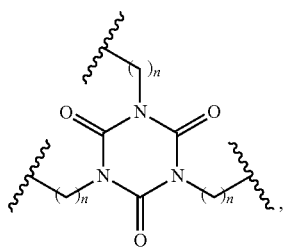

wherein n is an integer from 1 to about 100. It is to be noted that the foregoing P and Q can be selected using standard chemical principles and bonding to design such functionalized branched linkers having a total of three or more arms or attachment points, further nonlimiting examples of such P or Q group can include:

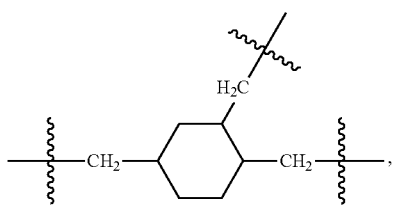

and each $R_1$, $R_2$, $R_3$ and $R_4$ are independently selected from the group consisting of aryl, $(C_1-C_{20})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;
each $R_5$ is independently selected from F, Cl, Br, and I;
and x is an integer from about 2 to about 500.

In another aspect the present invention relates to a hyperbranched cyclic oligomer or polymer corresponding to formula (IIa).

In another aspect the present invention relates to a hyperbranched cyclic oligomer or polymer corresponding to formula (IIb)

In another aspect the present invention relates to a hyperbranched cyclic oligomer or polymer corresponding to formula (IIa) or (IIb) wherein $R_1$, $R_2$, and $R_3$ are each methyl.

In another aspect the present invention relates to a hyperbranched cyclic oligomer or polymer corresponding to formula (IIa) or (IIb) wherein x is an integer from about 2 to about 500.

In another aspect the present invention relates to a hyperbranched cyclic oligomer or polymer corresponding to formula (IIa) or (IIb) wherein x is an integer from about 2 to about 50.

In another aspect the present invention relates to a hyperbranched cyclic oligomer or polymer corresponding to formula (IIa) or (IIb) wherein x is an integer from about 2 to about 20.

In another aspect the present invention relates to a hyperbranched cyclic oligomer or polymer corresponding to formula (IIa) or (IIb) wherein x is an integer from about 2 to about 8.

In another aspect the present invention relates to a cyclic oligomer or polymer comprising two or more hindered urea bond functional groups.

In another aspect the present invention relates to a cyclic oligomer or polymer comprising from about 2 to about 500 hindered urea bond functional groups.

In another aspect the present invention relates to a cyclic oligomer or polymer comprising from about 2 to about 50 hindered urea bond functional groups.

In another aspect the present invention relates to a cyclic oligomer or polymer comprising from about 2 to about 20 hindered urea bond functional groups.

In another aspect the present invention relates to a cyclic oligomer or polymer comprising from about 2 to about 8 hindered urea bond functional groups.

In another aspect the present invention relates to a cyclic oligomer or polymer wherein the hindered urea bond functional group corresponds to formula (IIIa) or (IIIb)

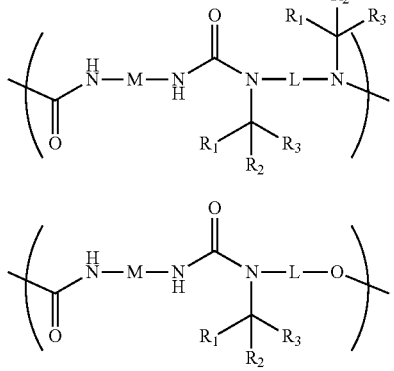

(IIIa)

(IIIb)

wherein L and M are independently selected from $(C_1\text{-}C_{100})$ alkyl, $(C_4\text{-}C_{10})$cyclolalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_1\text{-}C_{20})$alkyl$(C_6\text{-}C_{10})$aryl$(C_1\text{-}C_{20})$alkyl, $(C_2\text{-}C_{20})$alkyl-PEG-$(C_2\text{-}C_{20})$alkyl, —$(C_1\text{-}C_{20})$alkylO$(C_1\text{-}C_{20})$alkyl-, —$(C_1\text{-}C_{20})$alkylS$(C_1\text{-}C_{20})$alkyl-, —NR$_4$—, =N—, —C(R$_5$)$_2$—, —NC(=O)(C$_1$-C$_{20}$)alkyl-, —C(=O)(C$_1$-C$_{20}$)alkyl-, —C(=O)—(NR$_4$)—, —S(=O)$_2$O—, —S(=O)$_2$(C$_1$-C$_{20}$)alkyl-, —OS(=O)$_2$O(C$_1$-C$_{20}$)alkyl-, —S(=O)$_2$NR$_4$—, —S(=O)(C$_1$-C$_{20}$)alkyl-, —P(=O)(OR$_4$)O—, —C(S)—(C$_1$-C$_{20}$)alkyl-, —C(O)O(C$_1$-C$_{20}$)alkyl-, —C(=O)O—, —C(=S)O(C$_1$-C$_{20}$)alkyl-, —C(=O)S(C$_1$-C$_{20}$)alkyl-, —C(=S)S(C$_1$-C$_{20}$)alkyl-, —C(O)NR$_4$—(C$_1$-C$_{20}$)alkyl-, and —C(=NR$_4$)NR$_4$—;

each R$_1$, R$_2$, R$_3$ and R$_4$ are independently selected from the group consisting of aryl, (C$_1$-C$_{20}$)alkyl, (C$_4$-C$_{10}$)cyclolalkyl, (C$_1$-C$_{20}$)alkyl(C$_4$-C$_{10}$)cycloalkyl, (C$_1$-C$_{20}$)alkyl(C$_4$-C$_{10}$)cycloalkyl(C$_1$-C$_{20}$)alkyl, (C$_2$-C$_{20}$)alkyl-PEG-(C$_2$-C$_{20}$)alkyl, and H;

and each R$_5$ is independently selected from F, Cl, Br, and I.

In another aspect the present invention relates to a cyclic oligomer or polymer wherein the hindered urea bond functional group corresponds to formula (IIIa).

In another aspect the present invention relates to a cyclic oligomer or polymer wherein the hindered urea bond functional group corresponds to formula (IIIb).

In another aspect the present invention relates to a cyclic oligomer or polymer wherein the hindered urea bond functional group corresponds to formula (IIIa) or (IIIb) wherein R$_1$, R$_2$, and R$_3$ are each methyl.

In another aspect the present invention relates to a cyclic oligomer or polymer wherein the hindered urea bond functional group corresponds to formula (IIIa) or (IIIb) wherein M is

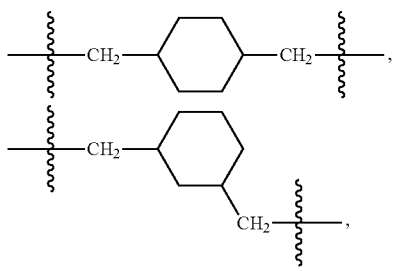

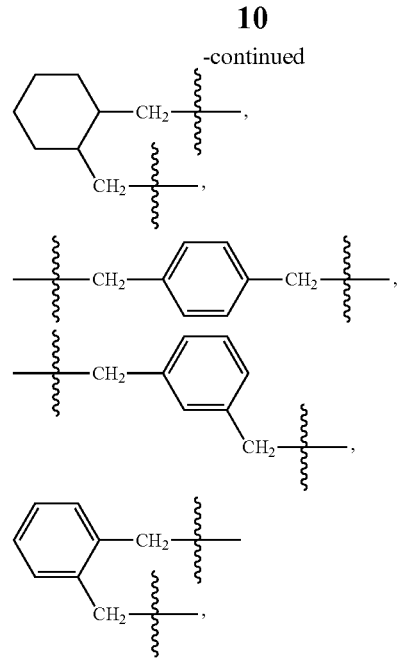

and $(C_1\text{-}C_{100})$alkyl, and L is —(CH$_2$CH$_2$)—.

In another aspect the present invention relates to a cyclic hyperbranched oligomer or polymer comprising two or more hindered urea bond functional groups.

In another aspect the present invention relates to a cyclic hyperbranched oligomer or polymer according comprising from about 2 to about 500 hindered urea bond functional groups.

In another aspect the present invention relates to a cyclic hyperbranched oligomer or polymer according comprising from about 2 to about 50 hindered urea bond functional groups.

In another aspect the present invention relates to a cyclic hyperbranched oligomer or polymer according comprising from about 2 to about 20 hindered urea bond functional groups.

In another aspect the present invention relates to a cyclic hyperbranched oligomer or polymer according comprising from about 2 to about 8 hindered urea bond functional groups.

In another aspect the present invention relates to a cyclic hyperbranched oligomer or polymer wherein the hindered urea bond functional group corresponds to formula (IVa) or (IVb)

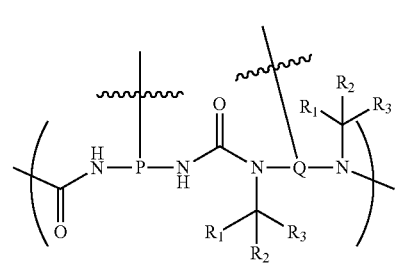

(IVa)

(IVb)

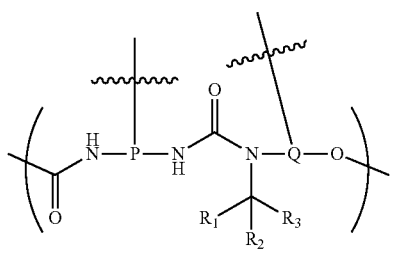

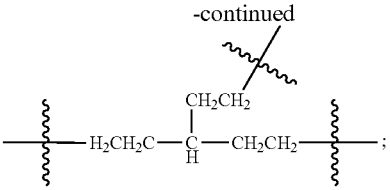

wherein P and Q are independently selected from functionalized branched linkers each having a total of two or more arms (attachment points), wherein at least one of P or Q has three or more arms (attachment points), selected from ($C_1$-$C_{100}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, —($C_1$-$C_{20}$)alkylO($C_1$-$C_{20}$)alkyl-, —($C_1$-$C_{20}$)alkylS($C_1$-$C_{20}$)alkyl-, —C($R_5$)$_2$—, —NC(=O)($C_1$-$C_{20}$)alkyl-, —C(=O)($C_1$-$C_{20}$)alkyl-, —S(=O)$_2$—($C_1$-$C_{20}$)alkyl-, —OS(=O)$_2$O($C_1$-$C_{20}$)alkyl-, —S(=O)($C_1$-$C_{20}$)alkyl-, —C(S)—($C_1$-$C_{20}$)alkyl-, —C(O)O($C_1$-$C_{20}$)alkyl-, —C(=S)O($C_1$-$C_{20}$)alkyl-, —C(=O)S($C_1$-$C_{20}$)alkyl-, —C(=S)S($C_1$-$C_{20}$)alkyl-, —S(=O)$_2$NR$_4$—, —C(O)NR$_4$—($C_1$-$C_{20}$)alkyl, —C(=NR$_4$)NR$_4$—, and

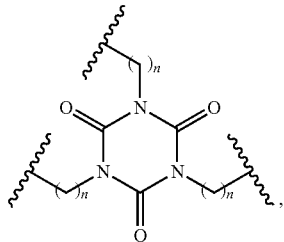

wherein n is an integer from 1 to about 100. It is to be noted that the foregoing P and Q can be selected using standard chemical principles and bonding to design such functionalized branched linkers having a total of three or more arms or attachment points, further nonlimiting examples of such P or Q group can include:

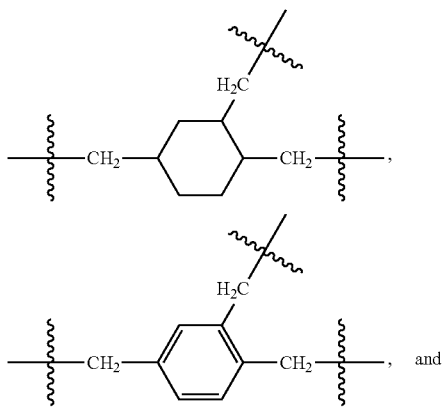

each $R_1$, $R_2$, $R_3$ and $R_4$ are independently selected from the group consisting of aryl, ($C_1$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_2$-$C_{20}$)alkyl-PEG-($C_2$-$C_{20}$)alkyl, and H;

and each $R_5$ is independently selected from F, Cl, Br, and I.

In another aspect the present invention relates to a cyclic hyperbranched oligomer or polymer wherein the hindered urea bond functional group corresponds to formula (IVa).

In another aspect the present invention relates to a cyclic hyperbranched oligomer or polymer wherein the hindered urea bond functional group corresponds to formula (IVb).

In another aspect the present invention relates to a cyclic hyperbranched oligomer or polymer wherein the hindered urea bond functional group corresponds to formula (IVa) or (IVb) wherein $R_1$, $R_2$, and $R_3$ are each methyl.

In another aspect the present invention relates to a cyclic oligomer or polymer or a cyclic hyperbranched oligomer or polymer prepared from reacting a difunctional isocyante according to formula (V) or a polyfunctional isocyante according to formula (VI)

OCN-M-NCO (V)

M-(-NCO)$_y$ (VI)

wherein y is an integer from about 2 to about 10;
with a difunctional hindered amine according to formula (VII) or a polyfunctional hindered amine according to formula (VIII)

$$HN-L-NH$$
$$R_1 \diagdown \diagup R_1$$
$$R_2 \; R_3 \qquad R_3 \; R_2$$
(VII)

$$L\!\!-\!\!\left(\!\!\begin{array}{c}NH\\ \diagdown R_1\\ R_3\;R_2\end{array}\!\!\right)_{\!z}$$
(VIII)

wherein z is an integer from about 2 to about 10;
wherein L and M are independently selected from ($C_1$-$C_{100}$) alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, —($C_1$-$C_{20}$)alkylO($C_1$-$C_{20}$)alkyl-, —($C_1$-$C_{20}$)alkylS($C_1$-$C_{20}$)alkyl-, —NR$_4$—, =N—, —C($R_5$)$_2$—, —NC(=O)($C_1$-$C_{20}$)alkyl-, —C(=O)($C_1$-$C_{20}$)alkyl-, —C(=O)—(NR$_4$)—, —S(=O)$_2$O—, —S(=O)$_2$($C_1$-$C_{20}$)alkyl-, —OS(=O)$_2$O($C_1$-$C_{20}$)alkyl-, —S(=O)$_2$NR$_4$—, —S(=O)($C_1$-$C_{20}$)alkyl-, —P(=O)(OR$_4$)O—, —C(S)—($C_1$-$C_{20}$)alkyl-, —C(O)O($C_1$-$C_{20}$)alkyl-, —C(=O)O—, —C(=S)O($C_1$-$C_{20}$)alkyl-, —C(=O)S($C_1$-$C_{20}$)alkyl-, —C(=S)S($C_1$-$C_{20}$)alkyl-, —C(O)NR$_4$—($C_1$-$C_{20}$)alkyl-, and —C(=NR$_4$)NR$_4$—;
each $R_1$, $R_2$, $R_3$ and $R_4$ are independently selected from the group consisting of aryl, ($C_1$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_2$-$C_{20}$)alkyl-PEG-($C_2$-$C_{20}$)alkyl, and H;

and each $R_5$ is independently selected from F, Cl, Br, and I.

In another aspect the present invention relates to a cyclic oligomer or polymer or a cylic hyperbranched oligomer or polymer prepared from diluting a linear polyurea corresponding to the formula (IXa) or (IXb)

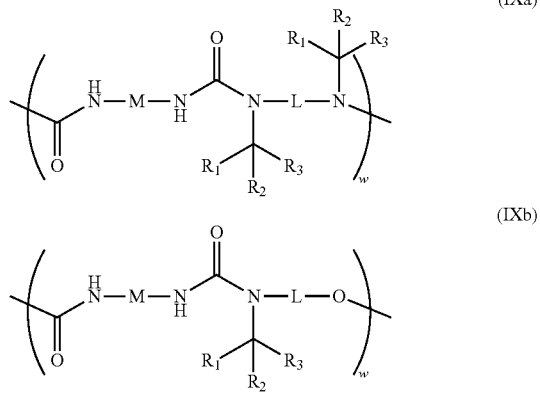

(IXa)

(IXb)

or a hyperbranched polyurea corresponding to the formula Xa or Xb

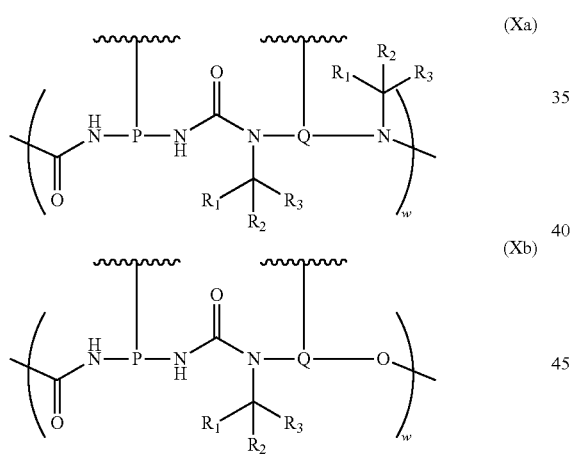

(Xa)

(Xb)

wherein L and M are independently selected from ($C_1$-$C_{100}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, —($C_1$-$C_{20}$)alkylO($C_1$-$C_{20}$)alkyl-, —($C_1$-$C_{20}$)alkylS($C_1$-$C_{20}$)alkyl-, —NR$_4$—, =N—, —C(R$_5$)$_2$—, —NC(=O)($C_1$-$C_{20}$)alkyl-, —C(=O)($C_1$-$C_{20}$)alkyl-, —C(=O)—(NR$_4$)—, —S(=O)$_2$O—, —S(=O)$_2$—($C_1$-$C_{20}$)alkyl-, —OS(=O)$_2$O($C_1$-$C_{20}$)alkyl-, —S(=O)$_2$NR$_4$—, —S(=O)($C_1$-$C_{20}$)alkyl-, —P(=O)(OR$_4$)O—, —C(S)—($C_1$-$C_{20}$)alkyl-, —C(O)O($C_1$-$C_{20}$)alkyl-, —C(=O)O—, —C(=S)O($C_1$-$C_{20}$)alkyl-, —C(=O)S($C_1$-$C_{20}$)alkyl-, —C(=S)S($C_1$-$C_{20}$)alkyl-, —C(O)NR$_4$—($C_1$-$C_{20}$)alkyl-, and —C(=NR$_4$)NR$_4$—;

P and Q are independently selected from functionalized branched linkers each having a total of two or more arms (attachment points), wherein at least one of P or Q has three or more arms (attachment points), selected from ($C_1$-$C_{100}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, —($C_1$-$C_{20}$)alkylO($C_1$-$C_{20}$)alkyl-, —($C_1$-$C_{20}$)alkylS($C_1$-$C_{20}$)alkyl-, —NC(=O)($C_1$-$C_{20}$)alkyl-, —C(=O)($C_1$-$C_{20}$)alkyl-, —S(=O)$_2$—($C_1$-$C_{20}$)alkyl-, —OS(=O)$_2$O($C_1$-$C_{20}$)alkyl-, —S(=O)$_2$NR$_4$—, —S(=O)($C_1$-$C_{20}$)alkyl-, —C(S)—($C_1$-$C_{20}$)alkyl-, —C(O)O($C_1$-$C_{20}$)alkyl-, —C(=S)O($C_1$-$C_{20}$)alkyl-, —C(=O)S($C_1$-$C_{20}$)alkyl-, —C(=S)S($C_1$-$C_{20}$)alkyl-, —S(=O)$_2$NR$_4$—, —C(O)NR$_4$—($C_1$-$C_{20}$)alkyl-, —C(=NR$_4$)NR$_4$—, and

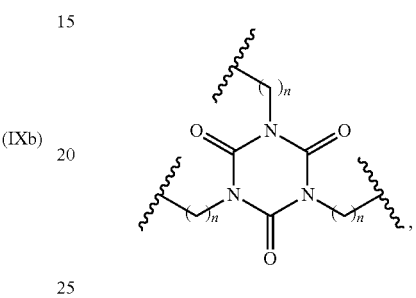

wherein n is an integer from 1 to about 100. It is to be noted that the foregoing P and Q can be selected using standard chemical principles and bonding to design such functionalized branched linkers having a total of three or more arms or attachment points, further nonlimiting examples of such P or Q group can include:

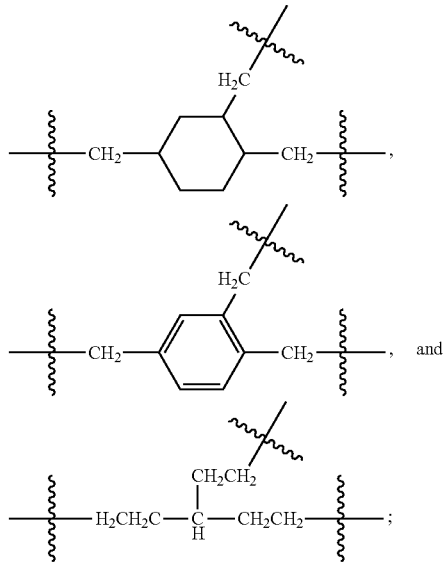

each $R_1$, $R_2$, $R_3$ and $R_4$ are independently selected from the group consisting of aryl, ($C_1$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_2$-$C_{20}$)alkyl-PEG-($C_2$-$C_{20}$)alkyl, and H;

each $R_5$ is independently selected from F, Cl, Br, and I;

and w is an integer from 2 to about $1 \times 10^6$.

In another aspect the present invention relates to an elastomer comprising a cyclic oligomer or polymer of the present invention or a hyperbranched cyclic oligomer or polymer of the present invention.

In another aspect the present invention relates to a coating comprising a cyclic oligomer or polymer of the present invention or a hyperbranched cyclic oligomer or polymer of the present invention.

In another aspect the present invention relates to a liquid coating comprising a cyclic oligomer or polymer of the present invention or a hyperbranched cyclic oligomer or polymer of the present invention.

In another aspect the present invention relates to a powder coating comprising a cyclic oligomer or polymer of the present invention or a hyperbranched cyclic oligomer or polymer of the present invention.

In another aspect the present invention relates to a metal substrate coated with the coating material.

In another aspect the present invention relates to a method for preparing a linear polymer product comprising reacting a cyclic oligomer or polymer according to the present invention.

In another aspect the present invention relates to a method for preparing a hyperbranched or cross-linked polymer product comprising reacting a hyperbranched cyclic oligomer or polymer according to the present invention.

Definitions

As used herein, the following terms have the indicated meanings unless expressly stated to the contrary:

The term "bulky" as used herein refers to a group or substituent having steric hindrance, especially where the bulky group provides dynamic exchange within a polymer, as described herein. The term "bulky" may be applied to an alkyl, amino, or other group. Exemplary "bulky alkyl" groups include, but are not limited to isopropyl, tert-butyl, neopentyl, and adamantly. Exemplary "bulky aryl" groups include, but are not limited to, trityl, biphenyl, naphthayl, indenyl, anthracyl, fluorenyl, azulenyl, phenanthrenyl, and pyrenyl. Exemplary "bulky amine" groups include, but are not limited to, tertiary amines substituted with one or more bulky akyl or bulky aryl groups, such as two tert-butyl groups. Exemplary "bulky amide" groups include, but are not limited to, carboxyl groups coupled to a bulky amine.

The term "cyclic hyperbranched oligomer" or "polymer" as used herein refers to an oligomer or polymer with multiple branching.

The term "dynamic bond" or "dynamic bond functional group" refers to a bond or chemical group or functional group that can reversibly form and dissociate. The term "dynamic urea bond" as used herein refers to a urea bond in the polymers herein that can reversibly form and dissociate. Ureas can be represented by the following chemical Structure 1:

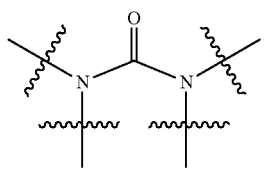

Structure 1

It should be recognized that ureas represent a subset of other oxygen, nitrogen, and sulfur-containing variants, as represented by the more general chemical Structure 2, which are also considered as part of the present invention:

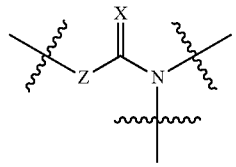

Structure 2 wherein with respect to these Structures 1 and 2, X is O or S; Z is O, S, or $NR_4$, wherein $R_4$ is selected from the group consisting of $(C_1-C_{20})$alkyl, $(C_4-C_{10})$cycolalkyl, $(C_1-C_{20})$alkyl$(C_4-C_{10})$cycloalkyl, $(C_1-C_{20})$alkyl$(C_4-C_{10})$cycloalkyl $(C_1-C_{20})$alkyl, $C_2-C_{20}$)alkyl-PEG-$(C_2-C_{20})$alkyl, and H.

The term wherein functionalized branched linkers as used herein refers to P and Q in the indicated structures, such that P and Q are independently selected from functionalized branched linkers each having a total of two or more arms (attachment points), wherein at least one of P or Q has three or more arms (attachment points), wherein P and Q are each independently selected from $(C_1-C_{100})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_1-C_{20})$alkyl$(C_6-C_{10})$aryl $(C_1-C_{20})$alkyl, and $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —$C(R_5)_2$—, —NC(=O)$(C_1-C_{20})$alkyl-, —C(=O)$(C_1-C_{20})$alkyl-, —S(=O)$_2$—$(C_1-C_{20})$alkyl-, —OS(=O)$_2$O$(C_1-C_{20})$alkyl-, —S(=O)$_2NR_4$—, —S(=O)$(C_1-C_{20})$alkyl-, —C(S)—$(C_1-C_{20})$alkyl-, —C(O)O$(C_1-C_{20})$alkyl-, —C(=S)O$(C_1-C_{20})$alkyl-, —C(=O)S$(C_1-C_{20})$alkyl-, —C(=S)S$(C_1-C_{20})$alkyl-, —S(=O)$_2NR_4$—, —C(O)$NR_4$—$(C_1-C_{20})$alkyl-, and —C(=$NR_4$)$NR_4$ (it is to be noted that the foregoing P and Q can be selected using standard chemical principles and bonding to design such functionalized branched linkers having a total of three or more arms or attachment points), nonlimiting examples of such P or Q group can include:

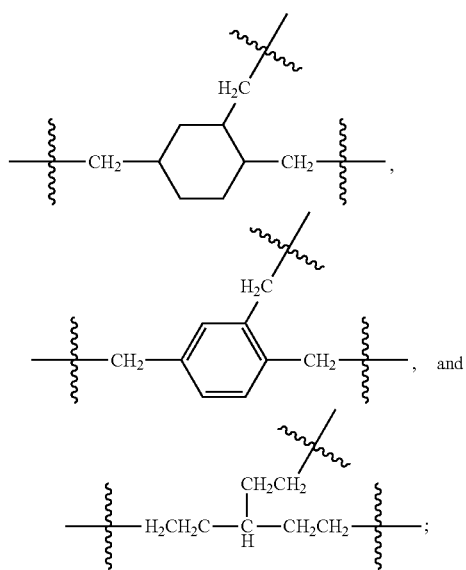

where each $R_4$ is independently selected from the group consisting of $(C_1-C_{20})$alkyl, $(C_4-C_{10})$cycolalkyl, $(C_1-C_{20})$alkyl$(C_4-C_{10})$cycloalkyl, $(C_1-C_{20})$alkyl$(C_4-C_{10})$cycloalkyl $(C_1-C_{20})$alkyl, $(C_2-C_{20})$alkyl-PEG-$(C_2-C_{20})$alkyl, and H;

and each $R_5$ is independently selected from F, Cl, Br, and I; and wherein P and Q each has a total of three or more arms or branches.

The term "hindered" as used herein refers to a chemical group, such as a hindered bond functional group. In the present invention, a hindered bond functional group includes urea bonds of the present invention that are sterically hindered by one or more bulky groups or substituents. Furthermore, it is recognized that additional substituents can be described to flank these bonds as further shown in structure 1.

The term "hindered urea bond" as used herein refers to a urea bond in a polymer of the present invention that is hindered with one or more bulky groups. It is recognized the "hindered urea bonds" represent a subset of various oxygen, sulfur, and nitrogen-substituted ureas that are considered part of the present invention.

The term "hydrolysable" as used herein means that the hindered bonds or functional groups, such as the hindered urea bonds, can be broken down, or undergo hydrolysis in the presence of water. In its common usage, hydrolysis means the cleavage of chemical bonds by the addition of water. In certain embodiments of the present invention, the hindered bond can undergo hydrolysis.

The term "hyperbranched" as used herein means a polymer having a very highly branched structure or network.

The term "reversible polymer" as used herein refers to a polymer with blocks or repeating units containing non-covalent or dynamic covalent bonds that can reversibly form and dissociate.

The term "self-healing" as used herein refers to the property of a reversible polymer that autonomously repairs damage caused by mechanical usage over time and recovers substantially its original modulus and strength.

The term "shape memory polymer" as used herein refers to a polymeric smart material that has the ability to return from a deformed state, i.e. its temporary shape, to its original or permanent shape, induced by a stimulus or trigger.

The term "acyl," as used herein alone or as part of another group, denotes the moiety formed by removal of the hydroxy group from the group COOH of an organic carboxylic acid, e.g., RC(O)—, wherein R is $R_1$, $R_1O$—, $R_1R_2N$—, or $R_1S$—, R1 is hydrocarbyl, heterosubstituted hydrocarbyl, or heterocyclo, and $R_2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" refers to a branched or unbranched hydrocarbon having, for example, from 1-20 carbon atoms, and often 1-12, 1-10, 1-8, 1-6, or 1-4 carbon atoms. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group includes both alkenyl and alkynyl groups. The alkyl can be a monovalent hydrocarbon radical, as described and exemplified above, or it can be a divalent hydrocarbon radical (i.e., an alkylene). In some embodiments, "alkyl" refers to a fully saturated alkyl. In other embodiments, "alkyl" is branched or unbranched, and is non-cyclic.

The term "alkenyl" as used herein describes groups which are preferably lower alkenyl containing from two to eight carbon atoms in the principal chain and up to 20 carbon atoms. They may be straight or branched chain and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted, as described for alkyl groups.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms in each ring. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent, and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties optionally substituted with other aliphatic or cyclic hydrocarbon groups, such as alkaryl, alkenaryl and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

Generally, the term "substituted" indicates that one or more hydrogen atoms on the group indicated in the expression using "substituted" is replaced with a "substituent". The number referred to by 'one or more' can be apparent from the moiety one which the substituents reside. For example, one or more can refer to, e.g., 1, 2, 3, 4, 5, or 6; in some embodiments 1, 2, or 3; and in other embodiments 1 or 2. The substituent can be one of a selection of indicated groups, or it can be a suitable group known to those of skill in the art, provided that the substituted atom's normal valency is not exceeded, and that the substitution results in a stable compound. Suitable substituent groups include, e.g., alkyl, alkenyl, alkynyl, alkoxy, halo, haloalkyl, hydroxy, hydroxyalkyl, aryl, aroyl, (aryl)alkyl (e.g., benzyl or phenylethyl), heteroaryl, heterocycle, cycloalkyl, alkanoyl, alkoxycarbonyl, amino, alkylamino, dialkylamino, trifluoromethyl, trifluoromethoxy, trifluoromethylthio, difluoromethyl, acylamino, nitro, carboxy, carboxyalkyl, keto, thioxo, alkylthio, alkylsulfinyl, alkylsulfonyl, arylsulfinyl, arylsulfonyl, heteroarylsulfinyl, heteroarylsulfonyl, heterocyclesulfinyl, heterocyclesulfonyl, phosphate, sulfate, hydroxyl amine, hydroxyl (alkyl)amine, and cyano. Additionally, suitable substituent groups can be, e.g., —X, —R, —O—, —OR, —SR, —S—, —NR2, —NR3, =NR, —CX3, —CN, —OCN, —SCN, —N=C=O, —NCS, —NO, —NO2, =N2, —N3, —NC(=O)R, —C(=O)R, —C(=O)NRR, —S(=O)$_2$O—, —S(=O)2OH, —S(=O)2R, —OS(=O)2OR, —S(=O)$_2$NR, —S(=O)R, —OP(=O)(OR)2, —P(=O)(OR)2, —OP(=O)(OH)(OR), —P(=O)(OH)(OR), —P(=O)(O—)2, —P(=O)(OH)2, —C(=O)R, —C(=O)X, —C(S)R, —C(O)OR, —C(O)O—, —C(S)OR, —C(O)SR, —C(S)SR, —C(O)NRR, —C(S)NRR, or —C(NR)NRR, where each X is independently a halogen ("halo"): F, Cl, Br, or I; and each R is independently H, alkyl, aryl, (aryl)alkyl (e.g., benzyl), heteroaryl, (heteroaryl)alkyl, heterocycle, heterocycle(alkyl), or a protecting group. As would be readily understood by one skilled in the art, when a substituent is keto (=O) or thioxo (=S), or the like, then two hydrogen atoms on the substituted atom are replaced. In some embodiments, one or more of the substituents above are excluded from the group of potential values for substituents on the substituted group.

The term "interrupted" indicates that another group is inserted between two adjacent carbon atoms (and the hydrogen atoms to which they are attached (e.g., methyl (CH3), methylene (CH2) or methine (CH) of a particular carbon chain being referred to in the expression using the term "interrupted, provided that each of the indicated atom's normal valency is not exceeded, and that the interruption results in a stable compound. Suitable groups that can interrupt a carbon chain include, e.g., with one or more non-peroxide oxy (—O—), thio (—S—), imino (—N(H)—), methylene dioxy (—OCH2O—), carbonyl (—C(=O)—), carboxy (—C(=O)O—), carbonyldioxy (—OC(=O)O—), carboxylato (—OC(=O)—), imine (C=NH), sulfinyl (SO) and sulfonyl (SO2). Alkyl groups can be interrupted by one or more (e.g., 1, 2, 3, 4, 5, or about 6) of the aforementioned suitable groups. The site of interruption can also be between a carbon atom of an alkyl group and a carbon atom to which the alkyl group is attached. An alkyl group that is interrupted by a heteroatom therefor forms a heteroalkyl group.

Substituents can include cycloalkylalkyl groups. "Cycloalkylalkyl" may be defined as a cycloalkyl-alkyl-group in which the cycloalkyl and alkyl moieties are as previously described. Exemplary monocycloalkylalkyl groups include cyclopropylmethyl, cyclopentylmethyl, cyclohexylmethyl and cycloheptylmethyl.

Cyclic Dynamic Oligomeric Polyurea Precursors and Their Polymers

Polyureas can be synthesized by mixing multifunctional isocyanates and amines. The reaction can be clean and efficient. However, as discussed above, the curing of polyureas can be very fast even at ambient conditions. Too fast a reaction can bring difficulties to processing of polyureas because cross-linking always happens before complete homogenization of components. Often, special equipment is required for polyurea processing. For example, it is common to use a two-nozzle spray to apply polyurea coatings to facilitate the mixing of the two components immediately at application. However, this method wastes the material and requires the use of special protective equipment to prevent the inhalation of toxic dust and fog.

For step-growth polymerization, curing usually needs high concentration, since in low concentration mixing of multifunctional components usually only gives cyclic oligomers. However, the low concentration synthesis provides a means for a convenient curing method of polyureas. We found if we synthesize polyureas in low concentration in the form of cyclic oligomers, the oligomers can be converted to high molecular weight polymers, and thus one-component polyurea processing is realized, which avoids the difficulty of two-component mixing. Recently, we developed a new type of hindered urea bond (HUB), which dynamically exchanges with each other. With this chemistry, the size of polymers can be dynamically tuned by concentration, which makes it possible to use cyclic oligomers as one-component precursor for cross-linked polyureas.

Figure 1B:
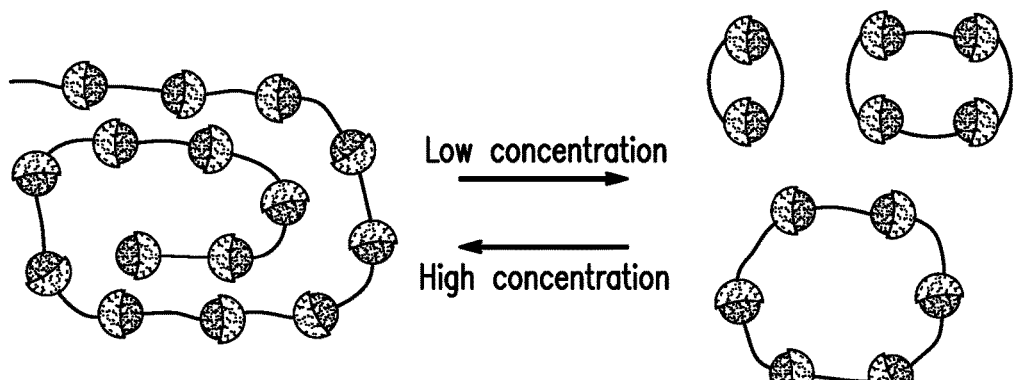
FIG. 1B depicts, based on Le Chatelier's principle, the equilibrium between a polymeric chain containing HUBs and oligomeric components.
Figure 1C:
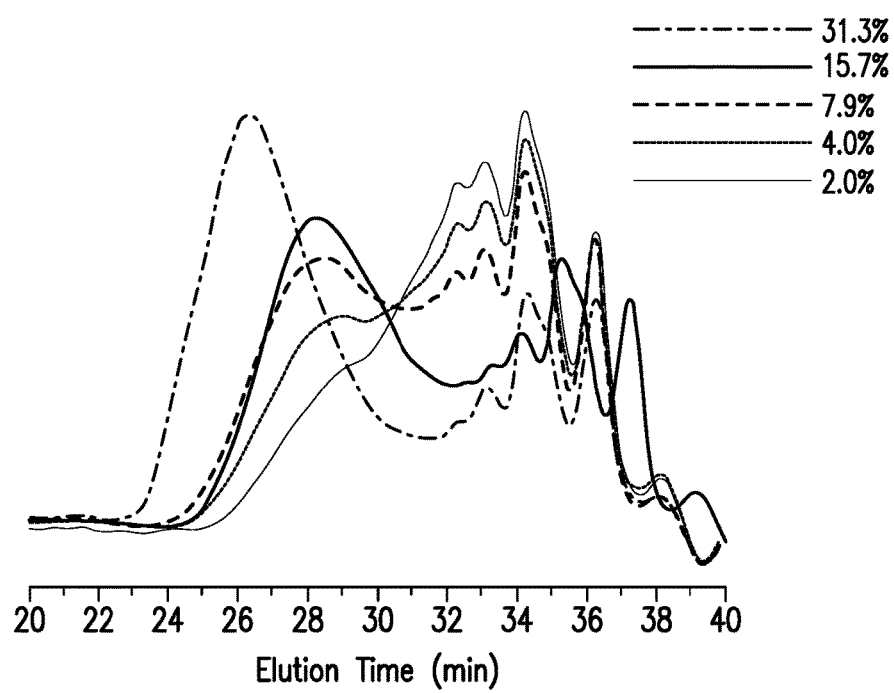
FIG. 1C depicts gel permeation chromatography curves of polymers with various final concentrations (15.7%, 7.9%, 4.0%, and 2.0% w/w) compared to an initial polymer concentration of 31.3% w/w. The solutions were diluted to the indicated concentrations and incubated at 37° C. for 24 hours before characterization.

Firstly, we studied the concentration-dependent molecular weight changing behaviors of linear dynamic polyureas. 1,3-Bis(isocyanatomethyl)cyclohexane and N,N'-di-tert-butylethylenediamine were mixed in 1:1 stoichiometry to synthesize linear polyurea (FIG. 1A). When diisocyanate and diamine were mixed in different concentrations, the resulting products showed different molecular weight. As shown by gel permeation chromatography (GPC), product from high concentration (>20%) showed high molecular weight (>10K), while product from low concentration (<2%) only showed molecular weight of several hundred to several thousand. This result is more kinetically controlled, since in low concentration, there is more likelihood of intramolecular back-biting to form cyclic oligomers than intermolecular chain elongation. The molecular weight of dynamic polyureas can still be tuned even after the polymers were synthesized, which decreases with the dilution of solution, vice versa. This result is thermodynamically controlled. According to Le Chatelier's principle, lower concentration leads to higher number of molecules. Therefore, long polymeric chain will be reduced to small molecular cyclic oligomers (FIG. 1B). However, dynamicity of the backbone is necessary for the achievement of thermodynamic equilibrium. As shown in FIG. 1C, polyurea was first synthesized with a very high concentration of 31.3% (w/w). Later, the solution was diluted gradually (15.7%, 7.9%, 4.0%, 2.0%) and each incubated at 37° C. for 24 h followed by GPC characterization. GPC curves gradually shifted to the right with the decrease of concentration, which demonstrated that the equilibrium shifted to the oligomeric cyclic species with the reduction of concentrations.

Figure 2:
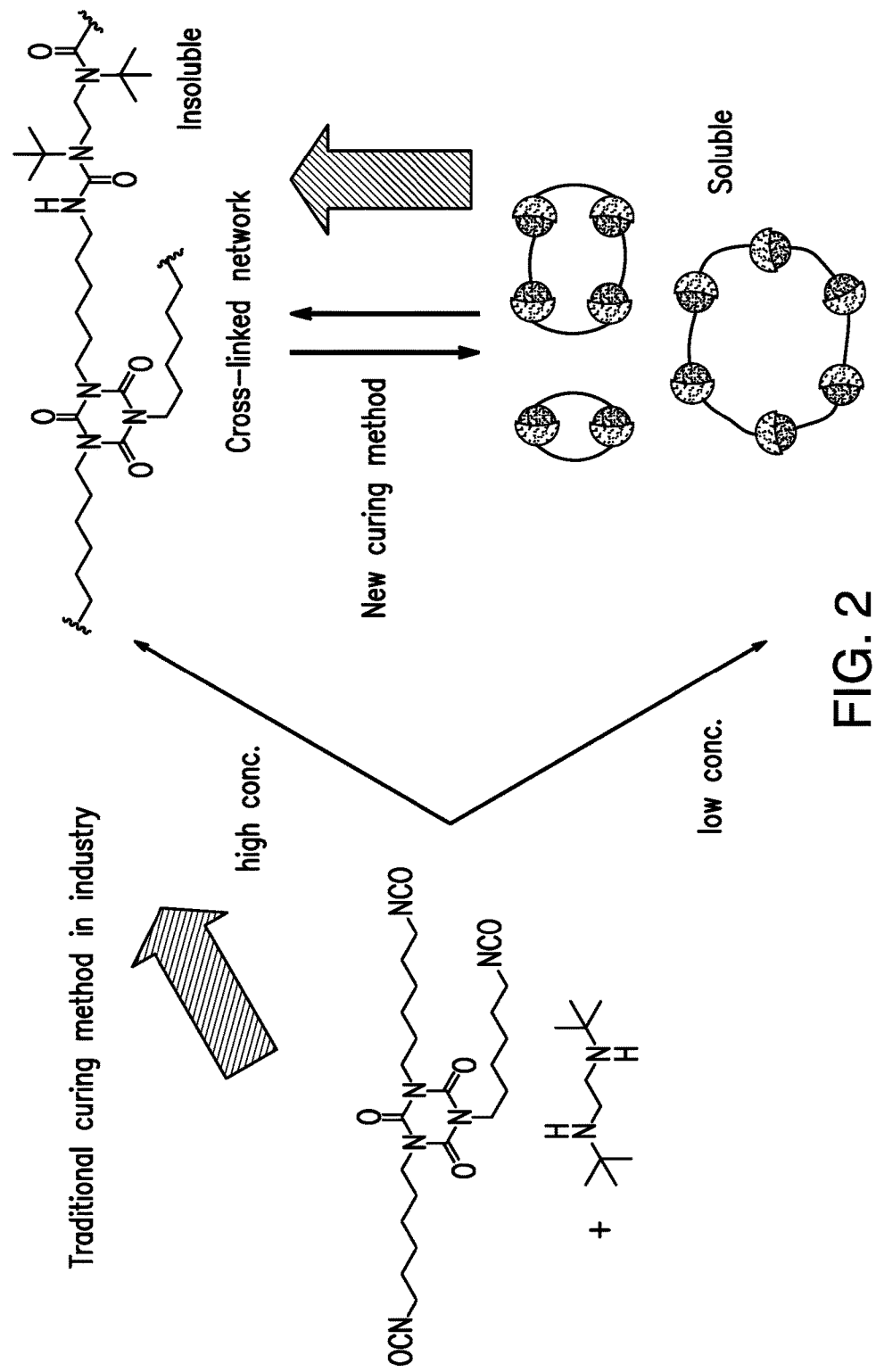
FIG. 2 depicts a traditional two-component curing of a polyurea versus the one-component curing of the present invention of a dynamic polyurea prepared via oligomeric polyurea precursors having HUBs.

Based on the above observations, we devised a new processing method for dynamic polyureas. Traditionally, cross-linked polyureas are cured from a multifunctional isocyanate and an amine. Because the addition reaction between isocyanate and amine is very fast, achieving complete homogenization before cross-linking is challenging. For dynamic polyureas synthesized from more bulky amine, although the reaction is slower than non-bulky ureas, the curing time is still too short for mixing, especially for more concentrated systems (FIG. 2). However, if a multifunctional isocyanate and an amine are mixed in a much diluted system, formation of oligomeric cyclic species is more favored (kinetic and thermodynamic control). In this case, we obtained cyclic precursors for cross-linked polyureas, which are of lower molecular weight, soluble, and processable. The precursors can even be dried and kept as a solid form, because it is postulated that chain exchange is slower in solid form. Lower storage temperature can further elongate the shelf life, i.e. the time before precursor exchanges and cross-links. For use, as long as one melts or dissolves the precursors at high concentration, and increases the temperature to accelerate the exchange dynamics, the cyclic precursors will reach their thermodynamically more favored state and become cross-linked (FIG. 2).

To demonstrate this point, we synthesized cyclic precursors. A tri-functionalized isocyanate and a di-functionalized hindered amine were mixed in chloroform with concentration of 1% (w/w). Under this concentration, cross-linking did not occur. The chloroform solvent was removed under vacuum to yield white crystals. The white crystals were soluble in organic solvent such as dimethyl formamide (DMF) in high concentration (FIG. 3A). We characterized the white crystal with GPC and FTIR. GPC showed that the molecular weight of white crystal is very low (several hundred, FIG. 3B). However, FTIR showed barely any peak for isocyanate (~2270 cm-1, FIG. 3B). This suggested that almost all the isocyanate had reacted, indicating that the low molecular species is the formation of the cyclic oligomeric compound.

Dynamic Bonds of the Cyclic Oligomeric Polyurea Precursors and Polymers

The cyclic oligomeric polyureas precursors and the resultant polymers of the present invention comprise dynamic bonds such as hindered urea bonds.

For example, the cyclic oligomeric polyurea precursors comprise a hindered bond functional group corresponding to the general chemical Structure 3

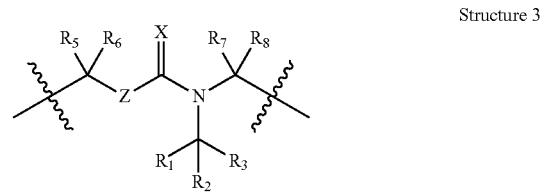

Structure 3 wherein with respect to Structure 3, X is O or S; Z is O, S, or $NR_4$; and $R_1$, $R_2$, $R_3$, $R_4$, $R_5$, $R_6$, $R_7$, and $R_8$ are independently selected from the group consisting of $(C_1$-$C_{20})$alkyl, $(C_4$-$C_{10})$cycolalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $C_2$-$C_{20})$alkyl-PEG-$(C_2$-$C_{20})$alkyl, and H.

Alternatively, the cyclic oligomeric polyurea precursors comprise a hindered bond functional group corresponding to the chemical Structure 4

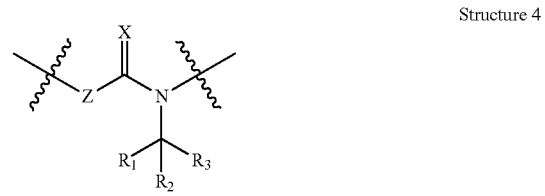

Structure 4 wherein with respect to Structure 4, X is O or S; Z is O, S, or $NR_4$; and $R_1$, $R_2$, $R_3$, and $R_4$ are independently selected from the group consisting of $(C_1$-$C_{20})$alkyl, $(C_4$-$C_{10})$cycolalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $C_2$-$C_{20})$alkyl-PEG-$(C_2$-$C_{20})$alkyl, and H.

Alternatively, the cyclic oligomeric polyurea precursors comprise a hindered urea bond functional group corresponding to the following chemical Structure 5

Structure 5

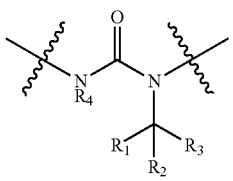

wherein with respect to Structure 5, $R_1$, $R_2$, $R_3$, and $R_4$ are independently selected from the group consisting of $(C_1-C_{20})$alkyl, $(C_4-C_{10})$cycolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $C_2-C_{20})$alkyl-PEG-$(C_2-C_{20})$alkyl, and H.

Polyureas Prepared from the Cyclic Oligomeric Polyurea Precursors

The polymers of the present invention comprise dynamic bonds such as dynamic urea bonds, and more particularly "hindered urea bonds" or "HUB s". The present invention provides polymers having dynamic urea bonds. These polymers include: (a) malleable, repairable, and reprogrammable shape memory polymers having HUBs and (b) reversible or degradable (e.g., via hydrolysis or aminolysis) linear, branched or network polymers having HUBs. With respect to the malleable, repairable, and reprogrammable shape memory polymers these include polymers containing other polymer generating functionality that now incorporate these HUB s, as well as to highly crosslinked polymers, and to polymers that are readily reprogrammed. For example, the degradation kinetics can be directly controlled by substituents bulkiness. In contrast to traditional hydrolysable polymers, the HUB containing polymers of the present invention can be synthesized form monomers by simple mixing without catalysts. Further background on earlier examples of polymers with dynamic urea bonds is disclosed in PCT Publication WO 2014/144539 A2, to The Board of Trustees of the University of Illinois, published Sep. 18, 2014, which is incorporated by reference herein in its entirety.

Polyureas are commonly used as fiber, coating and adhesive materials. Polyureas can be readily synthesized via the addition reaction of widely available, di- or multifunctional isocyanates and amines that do not require the use of catalysts and extreme reaction conditions and do not produce any byproducts. Urea is one of the most stable chemical bonds against further reactions including hydrolysis, due to the conjugation stabilization effects of its dual amide structure. However, urea bonds can be destabilized by incorporating bulky substituents to one of its nitrogen atoms, by means of disturbing the orbital co-planarity of the amide bonds that diminishes the conjugation effect. Urea bonds bearing a bulky substituent, or hindered urea bonds (HUBs), can reversibly dissociate into isocyanate and amines and show interesting dynamic property. The fast reversible reactions between HUBs and isocyanates/amines have been the basis in the design of self-healing polyureas. Because isocyanates can be subject to hydrolysis in aqueous solution to form amines and carbon dioxide, an irreversible process that shifts the equilibrium to favor the HUB dissociation reaction and eventually leads to irreversible and complete degradation of HUBs, can be used to design hydrolysable polymers. Herein, we report the development of HUB-based polyureas that can be tunable by the steric hindrance of the HUB structures.

Precursors for the Oligomers

The oligomers of the present invention can be prepared from reacting a difunctional or polyfunctional isocyante according to formula (V) or (VI)

OCN-M-NCO (V)

M-(-NCO)$_y$ (VI)

wherein y is an integer from about 2 to about 10; with a difunctional or polyfunctional hindered amine according to formula 4 (VII) or (VIIII)

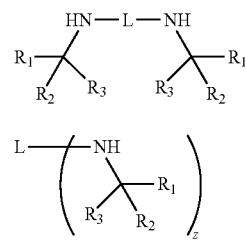

wherein z is an integer from about 2 to about 10; and z if an integer from about 2 to about 10; M and L are selected from $(C_1-C_{100})$alkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_1-C_{20})$alkyl$(C_6-C_{10})$aryl$(C_1-C_{20})$alkyl, and $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS $(C_1-C_{20})$alkyl-, —NR$_4$—, =N—, —C(R$_5$)$_2$—, —NC(=O) $(C_1-C_{20})$alkyl-, —C(=O)$(C_1-C_{20})$alkyl-, —C(=O)— (NR$_4$)—, —S(=O)$_2$O—, —S(=O)$_2$—$(C_1-C_{20})$alkyl-, —OS(=O)$_2$O$(C_1-C_{20})$alkyl-, —S(=O)$_2$NR$_4$—, —S(=O) $(C_1-C_{20})$alkyl-, —P(=O)(OR$_4$)O—, —C(S)—$(C_1-C_{20})$ alkyl-, —C(O)O$(C_1-C_{20})$alkyl-, —C(=O)O—, —C(=S)O $(C_1-C_{20})$alkyl-, —C(=O)S$(C_1-C_{20})$alkyl-, —C(=S)S$(C_1-C_{20})$alkyl-, —C(O)NR$_4$—$(C_1-C_{20})$alkyl-, and —C(=NR$_4$) NR$_4$—;

each $R_1$, $R_2$, $R_3$ and $R_4$ are independently selected from the group consisting of aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H; each $R_5$ is independently selected from F, Cl, Br, and I.

Methods of Preparing Polymers

The disclosure further provides a method for preparing a copolymer comprising dynamic urea moieties. The method comprises contacting an alkyldiisocyanate and an alkyldiamine in solution, wherein the amines of the alkyldiamine comprise a tert-butyl substituent in a solvent system to form a cyclic oligourea. The oligourea is contacted with a trialkanolamine and a polyethylene glycol in the presence of a condensation reaction catalyst, thereby initiating cross-linking. The method provides a cross-linked poly(urea-urethane) polymer.

In one embodiment, the diisocyanate may be a $C_2-C_{12}$ diisocyanate. Exemplary diisocyantes include, but are not limited to, toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate, and tetramethylenexylylene diisocyanate. In some embodiments, the diisocyanate may be a $C_2-C_{12}$ diisocyanate.

Exemplary alkyldiamines include, but are not limited to, diprimary diamines, diamines containing one or two secondary amino groups with an alkyl substituent having from 1 to 8 carbon atoms attached to the N-atom, and a heterocyclic diamine. The diprimary aliphatic diamines may contain terminal amino groups. In some embodiments, the diamine may be ethylenediamine, propylenediamine, hexamethylenediamine, dimer fatty diamines, aromatic diamines, and homologs thereof. Suitable aromatic diamines may be derived from benzene, toluene or otherwise substituted aromatics, for example 2,6-tolylenediamine, 4,4-diphenylmethanediamine, and xylylenediamine. The corresponding cyclohexane derivatives may also be used. In one embodiment, the alkyldiamine may have the formula (tBu)NH—((C2-C20)alkyl)NH(tBu). In another embodiment, the alkyldiamine may have the formula (tBu)NH—((C2-C8)alkyl)NH(tBu).

Suitable trialkanolamines include, but are not limited to, trimethanolamine, triethanolamine, tripropanolamine, triisopropanolamine, tributanolamine, tri-sec-butanolamine, and tri-tert-butanolamine. In one embodiment, the trialkanolamine may be triethanolamine.

Suitable condensation reaction catalysts include, but are not limited to, 1,4-diazabicyclo[2.2.2]octane (DABCO, TEDA), dimethylcyclohexylamine (DMCHA), dimethylethanolamine (DMEA), mercury carboxylate, a bismuth compound, such as bismuth octanoate; or tin compound, such as dibutyltin diacetate, dibutyltin dilaurate, dibutyltin dichloride, dibutyltin bis(acetylacetonate), dibutyltin maleate, dibutyltin diisothiocyanate, dibutyltin dimyristate, dibutyltin dioleate, dibutyltin distearate, dibutyltin bis(lauryl mercaptide), dibutyltin bis(isooctylmercaptoacetate), dibutyltin oxide, stannous bis(2-ethylhexoate), stannous oxide, stannous oxatlate, hydrated monobutyltin oxide, monobutyltin trioctoate, dimethyltin salts, and dioctyltin salts. In one embodiment, the condensation reaction catalyst may be dibutyltin diacetate.

In one embodiment, the copolymer may be cured at about room temperature (23° C.) to about 75° C., such as from about 23° C. to about 30° C., from about 30° C. to about 35° C., from about 35° C. to about 40° C., from about 40° C. to about 45° C., from about 45° C. to about 50° C., from about 50° C. to about 55° C., from about 55° C. to about 60° C., from about 60° C. to about 65° C., from about 65° C. to about 70° C., or from about 70° C. to about 75° C. In some embodiments, the copolymer may be cured at a temperature less than 75° C. In some embodiments, the copolymer may be cured at a temperature greater than 23° C.

In one embodiment, the cross-linked poly(urea-urethane) polymer may be a reversible polymer at room temperature. In one embodiment, the stoichiometry of the components may be such that a gel point is achieved. The disclosure also provides a copolymer as described herein in combination with one or more additional polymers. The resulting composition may be, for example, a coating, fiber, adhesive, or plastic. The polyurea or copolymer may be self-healing.

The compounds and compositions can be prepared by any of the applicable techniques of organic synthesis. Many such techniques are well known in the art. Many known techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6, Michael B. Smith; as well as standard organic reference texts such as March's Advanced Organic Chemistry: Reactions, Mechanisms, and Structure, 5th Ed. by M. B. Smith and J. March (John Wiley & Sons, New York, 2001), Comprehensive Organic Synthesis; Selectivity, Strategy & Efficiency in Modern Organic Chemistry, in 9 Volumes, Barry M. Trost, Ed.-in-Chief (Pergamon Press, New York, 1993 printing)); Advanced Organic Chemistry, Part B: Reactions and Synthesis, Second Edition, Cary and Sundberg (1983); Protecting Groups in Organic Synthesis, Second Edition, Greene, T. W., and Wutz, P. G. M., John Wiley & Sons, New York; and Comprehensive Organic Transformations, Larock, R. C., Second Edition, John Wiley & Sons, New York (1999). The foregoing are incorporated by reference herein in their entirety.

A number of exemplary methods for preparing the compositions of the disclosure are provided below. These methods are intended to illustrate the nature of such preparations are not intended to limit the scope of applicable methods. Generally, the reaction conditions such as temperature, reaction time, solvents, work-up procedures, and the like, will be those common in the art for the particular reaction. The cited reference material, together with material cited therein, contains detailed descriptions of such conditions. Typically the temperatures will be 100° C. to 200° C., solvents will be aprotic or protic, depending on the conditions and reaction times will be 1 minute to 10 days. Work-up typically consists of quenching any unreacted reagents followed by partition between a water/organic layer system (extraction) and separation of the layer containing the product.

Oxidation and reduction reactions are typically carried out at temperatures near room temperature (about 20° C.), although for metal hydride reductions frequently the temperature is reduced to 0° C. to −100° C. Heating may also be used when appropriate. Solvents are typically aprotic for reductions and may be either protic or aprotic for oxidations. The reaction times are adjusted to achieve desired conversions.

The condensation reactions are typically carried out at temperatures near room temperature, although for non-equilibrating, kinetically controlled condensations reduced temperatures (0° C. to −100° C.) are also common. Solvents can be either protic (common in equilibrating reactions) or aprotic (common in kinetically controlled reactions). Standard synthetic techniques such as azeotropic removal of reaction byproducts and use of anhydrous reaction conditions (e.g. inert gas environments) are common in the art and will be applied when applicable.

Preparation of Oligomers by Dilution of Linear and Crosslinked Polymers

Alternatively, the oligomers of the present invention can be prepared by dilution of an appropriate polyurea polymer. An example of such a polymer is that of formula (IXa)

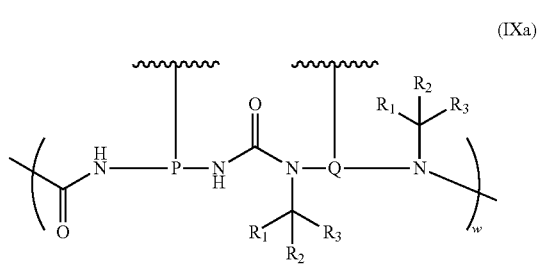

wherein P and Q are independently selected from functionalized branched linkers having a total of two or more arms (attachment points), wherein at least one of P or Q has three or more arms (attachment points), selected from $(C_1-C_{100})$ alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_1-C_{20})$alkyl$(C_6-C_{10})$aryl$(C_1-C_{20})$alkyl, $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —C$(R_5)_2$—, —NC(=O)$(C_1-C_{20})$alkyl-, —C(=O)$(C_1-C_{20})$alkyl-, —S(=O)$_2$—$(C_1-C_{20})$alkyl-, —OS(=O)$_2$O$(C_1-C_{20})$alkyl-, —S(=O)$(C_1-C_{20})$alkyl-, —C(S)—$(C_1-C_{20})$alkyl-, —C(O)O$(C_1-C_{20})$alkyl-, —C(=S)O$(C_1-C_{20})$alkyl-, —C(=O)S$(C_1-C_{20})$alkyl-, —C(=S)S$(C_1-C_{20})$alkyl-, —S(=O)$_2$NR$_4$—, —C(O)NR$_4$—$(C_1-C_{20})$alkyl-, —C(=NR$_4$)NR$_4$— and

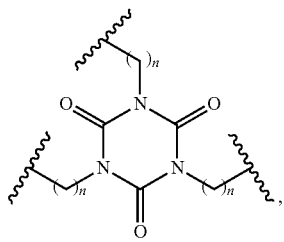

wherein n is an integer from 1 to about 100. It is to be noted that the foregoing P and Q can be selected using standard chemical principles and bonding to design such functionalized branched linkers having a total of three or more arms or attachment points, further nonlimiting examples of such P or Q group can include:

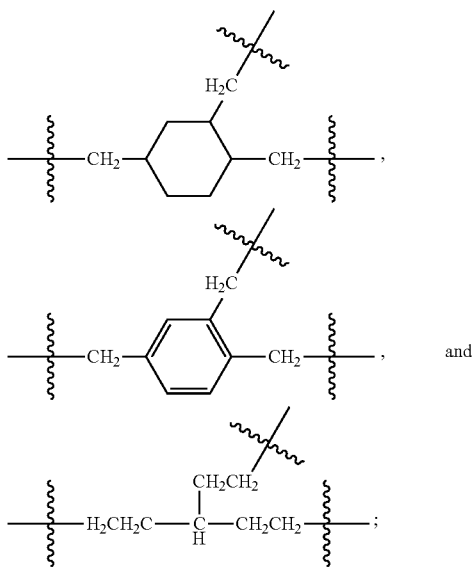

each $R_1$, $R_2$, $R_3$ and $R_4$ are independently selected from the group consisting of aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;
each $R_5$ is independently selected from F, Cl, Br, and I;
and w is an integer from 2 to about $1\times10^6$ Polymer Characteristics of Keq and Kinetics To render reversible chemistry dynamics and use the dynamic chemistry for the synthesis of polymers with bulk properties, both the forward and the reverse reaction should be very fast, with large $k_1$ and $k_{-1}$, and the equilibrium favors the formation of the polymer, large $K_{eq}=k_1/k_{-1}$. In the design of dynamic polyurea specifically, it is thus important to identify a hindered urea bond (HUB) with the properly selected substituent on the amine group so that the corresponding HUB can meet the above criteria. For example, equilibrium and exchange studies using 2-isocyanatoethyl methacrylate and amines with different steric hindrance to identify such HUB have been studied. See for example PCT Publication WO 2014/144539 A2, to The Board of Trustees of the University of Illinois, published Sep. 18, 2014, which is incorporated by reference herein in its entirety.

Coatings

Both liquid coatings and powder coatings can be made with the oligomeric or polymeric polyureas of the present invention. The liquid coatings can include additional components such as catalysts, flow and leveling agents, surface modifying additives, wetting agents, dispersing agents, foam-control agents, solvents, crosslinking additives, co-blended resins to modify properties, pigments and colorants, and degassing agents.

Powder coatings provide an important alternative to liquid coatings. These coatings can be prepared from resins, pigments, and additives. The powder is applied to a substrate, usually metal, and fused to form a continuous film by baking the coated metal, or by applying the powder coating to a heated substrate. The glass transition temperature and the melting point of the powder coating can be adjusted by the selection of the components and their proportion in the coating. It is highly desirable to adjust the glass transition temperature and melting point such that the powder coating remains as a free flowing powder at room temperature and elevated storage conditions, such as for example in a hot warehouse, but also readily melts to form a uniform coating on a substrate that has either been preheated before application of the powder coating or that is subsequently baked after application of the powder coating. While it is important to maintain a high enough glass transition temperature and melt temperature to prevent sintering, it is desirable to simultaneously tune the powder coating such that the optimal melt flow and crosslinking temperature is as low as possible, which results in a lower, narrower process window for films. This lower temperature is advantageous from an energy savings standpoint to the applicator. Additives are an important ingredient in the formulation of powder coatings. For the most part, additives perform the same functions in powder coatings as in liquid coatings. With the exception of wetting, dispersing and foam-control agents, many of the same additives used in liquid coatings are also used in powders. The powder coatings can comprise additional components such as crosslinking agents, flow control agents, degassing agents, catalysts, and pigmenting materials. The powder coatings can be applied to a metal substrate using conventional techniques known in the art such as electrostatic spraying. The metal substrate can either be preheated before application of the powder coating or baked after the application of the powder coating to thermally set the coating.

Powder coatings are typically used to create a hard or flexible finish that is tougher than a conventional paint coating which is applied in liquid form by spraying, brushing, dipping, or rolling and allowed to cure dry. Powder coating is used for example for coating of metals, such as household appliances, aluminum extrusions, drum hardware, automobile and bicycle parts.

See U.S. Pat. No. 5,637,654, to Panandiker et al, issued Jun. 10, 1997; U.S. Pat. No. 4,197,353, to Tobias et al, issued Apr. 8, 1980; PCT Patent Application No. WO 2011/138432 A1, to DSM IP Assets, B.V., published Nov. 10, 2011; and "Organic Coatings Science and Technology", 3rd Ed., Wiley, 2007, Z. Wicks, Jr., F. Jones, S. P. Pappas, D. A.

Wicks, Chapter 28. Each of the foregoing references are incorporated by reference herein in their entirety.

Powder coatings are usually made from a one-component thermoplastic material or a two-component thermoset of two powders that react with each other at elevated temperature. The oligoineric and polymeric polyureas of the present invention provide a one-component method for making a thermoset powder with the following advantages: simplicity of application and processing; avoids a two-component process, good solvent resistance, and mechanical strength.

The powders of the present invention, such as described in FIG. 3A, can be cured by melting in solid form at elevated temperatures, as described in Example 4, below, and FIG. 5.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

Example 1: Cyclic Oligomeric Polyureas 1,3-Bis(isocyanatomethyl)cyclohexane (1.94 g, 0.01 mmol) and N,N'-di-tert-butylethylenediamine (1.72 g, 0.01 mol) were mixed in DMF (8.03 g) and stirred at room temperature overnight. The resulting viscous solution was characterized by gel permeation chromatography (GPC) followed by a 2-fold series dilution (original concentration of 31.3% (w/w) to 15.7%, 7.8%, 3.9%, 2.0%). Each newly made solution was incubated at 37° C. for 24 h, and characterized by GPC to determine the molecular weight change. The results are shown in FIG. 1C.

Example 2: Cyclic Oligomeric Polyureas

DESMOUR-3900 (from Bayer company, tri-functionalized isocyanate, structure shown in FIG. 3, 86.7 mg, 0.516 mmol of NCO group) was dissolved in 10 mL chloroform, and N,N'-di-tert-butylethylenediamine (46.8 mg, 0.544 mmol of amine group) was dissolved in 5 mL chloroform. Two solutions were quickly mixed at room temperature and stirred overnight (concentration of solute was around 0.6% (w/w)). Then the solvent was dried by vacuum pump. A white solid was obtained as the cyclic precursor product. The white solid was dissolved in DMF to test the solubility, and characterized by Fourier transform infrared spectroscopy (FTIR) and GPC for the structure and molecular weight. See FIG. 3. The white solid obtained from above procedures was dissolved in DMF (40% (w/w)). The solution was incubated at 60° C. for 5 h. Gelation of the solution was observed. See FIG. 4.

Example 3: Curing of Cyclic Oligomeric Polyureas to Form a Powder Coating

A 100 mg sample of the solid oligomeric polyuria obtained from the above Example 3 was evenly distributed across the bottom of a 20 mL glass vial. The bottom of the vial was heated using a heat gun (>150° C.). Softening of the solid was observed with release of bubbles. After the bubbling stopped, the bottom of the vial was observed to be covered by a transparent layer. The resulting elastomer coating was cooled and observed to become glassy with a hardness in the range of about 10 MPa to about 5 GPa and a modulus in the range of about 10 MPa to about 5 GPa. FIG. 5 shows the material (right-most photograph) of the transparent elastomer obtained. The coating swelled rather than dissolved when a solvent such as acetone was added, which suggested that oligomeric powder was transformed to a cross-linked polymeric network.

Example 4: Hydrolysable Polyureas Bearing Hindered Urea Bonds

The references cited in this Example 4 are numbered with respect to this Example 4.

Hydrolysable polymers are widely used materials that have found numerous applications in biomedical, agricultural, plastic and packaging industrials. These polymers usually contain ester and other hydrolysable bonds, such as anhydride, acetal, ketal or imine groups in their backbone structures. Here, we report the design and synthesis of hydrolysable polyureas bearing dynamic hindered urea bonds (HUBs) that can reversibly dissociate to bulky amines and isocyanates, the latter of which can be further hydrolyzed by water, driving the equilibrium to facilitate the degradation of polyureas. Polyureas bearing 1-tert-butyl-1-ethylurea (TBEU) bonds that show high dynamicity (high bond dissociation rates), in the form of either linear polymers or cross-linked gels, can be completely degraded by water under mild conditions. Given the simplicity and low cost for the production of polyureas by simply mixing multifunctional bulky amines and isocyanates, the versatility of the structures and the tunability of the degradation profiles of HUB-bearing polyureas, these materials have potentially very broad applications.

Polymers with transient stability in aqueous solution, also known as hydrolysable polymers, have been applied in many biomedical applications, such as in the design of drug delivery systems,[1] scaffolds for tissue regeneration,[2] surgical sutures,[3] and transient medical devices and implants.[4] These applications usually require short functioning time, and complete degradation and clearance of materials after their use. Hydrolysable polymers have also been applied in the design of controlled release systems in the agriculture and food industries and used as degradable, environmentally friendly plastics and packaging materials.[5] Besides polyesters, a class of widely used, conventional hydrolysable materials,[6] a large variety of other hydrolysable polymers bearing anhydride,[7] orthoester,[8] acetal,[9] ketal,[10] aminal,[11] hemiaminal,[11-12] imine[13] phosphoester,[14] and phosphazene[15] groups have also been reported. Syntheses of these polymers usually involves condensation[2d] or ring-opening polymerization,[16] and these syntheses typically involve removal of byproducts[2d] and employ high reaction temperature[2d] and/or metal catalysts,[6b] which complicates the material preparation. In this study, we report the design of polyureas bearing hindered urea bonds (HUBs) as potentially one of the least expensive degradable polymers that can be easily synthesized by mixing multifunctional bulky amines and isocyanates, expanding the family of hydrolysable polymers.

Figure 6:
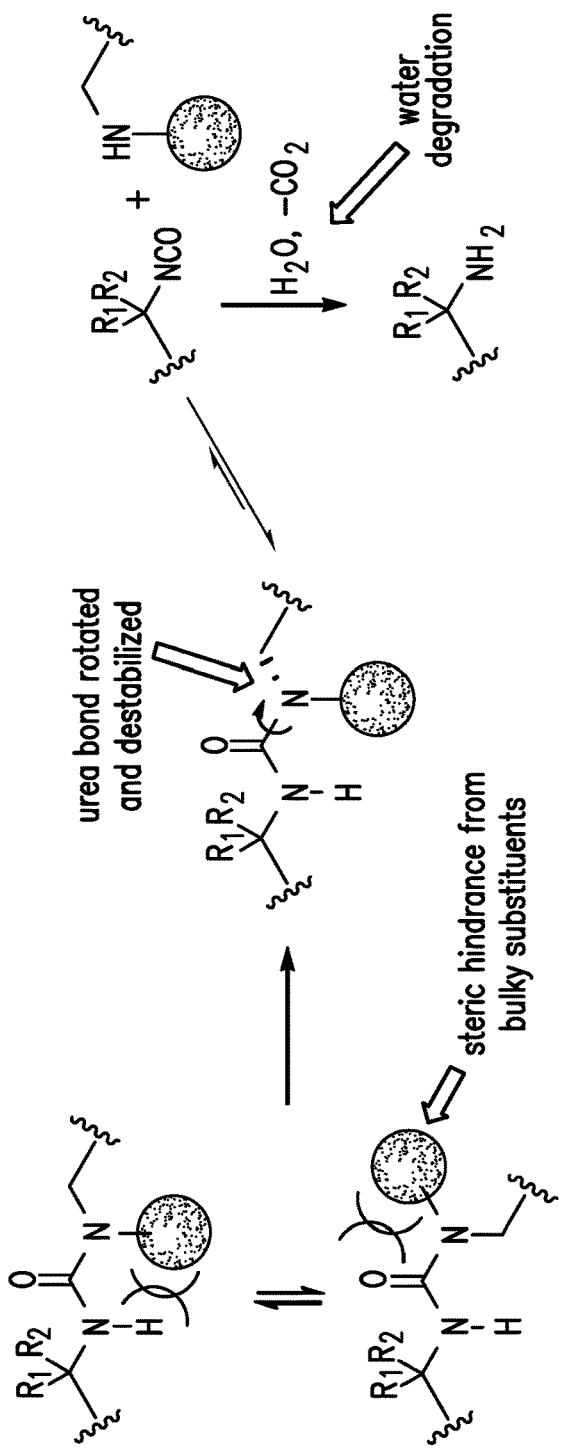
FIG. 6 is an illustration of the hydrolysis mechanism of hindered urea bonds (HUBs). The urea bond is destabilized by bulky substituent induced bond rotation and a loss of conjugation effect. Also, with respect to this FIG. 6, $R_1$ and $R_2$ are independently selected from the group consisting of $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $C_2-C_{20}$)alkyl-PEG-$(C_2-C_{20})$alkyl, and H, and combinations thereof.

Polyureas are commonly used as fiber, coating and adhesive materials. They can be readily synthesized via addition reaction of widely available, di- or multifunctional isocyanates and amines that do not require the use of catalysts and extreme reaction conditions and do not produce any byproducts. Urea groups are one of the most stable chemical bonds against further reactions including hydrolysis due to the conjugation stabilization effects of its dual amide structure. However, urea bonds can be destabilized by incorporating bulky substituents to one of the nitrogen atoms, by means of disturbing the orbital co-planarity of the amide bonds that diminishes the conjugation effect (FIG. 6).[17] Urea bonds bearing a bulky substituent, or hindered urea bonds (HUBs), can reversibly dissociate into isocyanate and amines and show interesting dynamic property. The fast reversible reactions between HUBs and isocyanates/amines have been the basis in our recent design of self-healing polyureas.[18] Because isocyanates can be subject to hydrolysis in aqueous solution to form amines and carbon dioxide, an irreversible process that shifts the equilibrium to favor the HUB dissociation reaction and eventually lead to irreversible and complete degradation of HUBs (FIG. 6), we reason that HUBs can be used to design easily available hydrolysable polymers potentially for the numerous applications above-mentioned. Herein, we report the development of HUB-based polyureas that can be hydrolyzed with hydrolytic degradation kinetics tunable by the steric hindrance of the HUB structures.

Figure 7A:
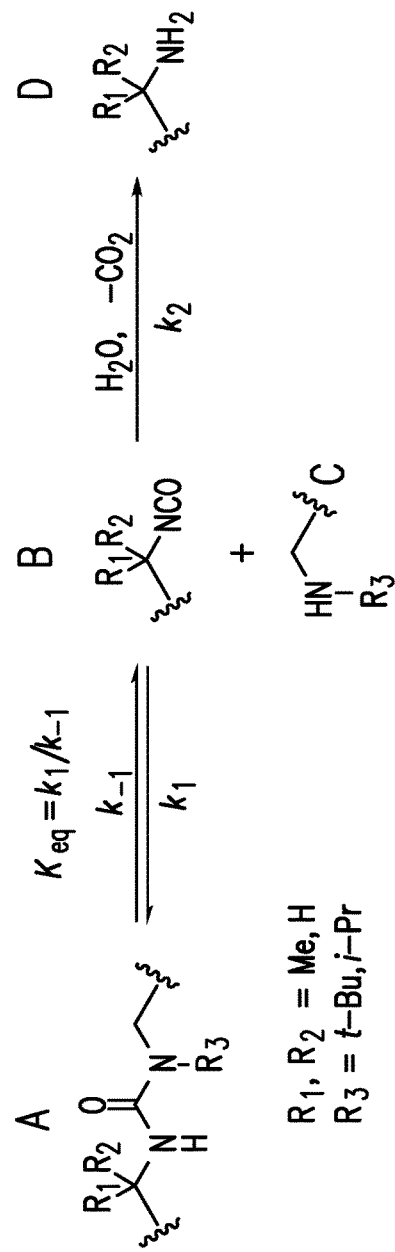

The property of a dynamic covalent bond can be expressed by its $K_{eq}$, the binding constant showing the thermodynamic stability of the dynamic bond, and its $k_{-1}$, the dissociation rate of the dynamic bond. According to the hydrolytic degradation mechanism of a HUB shown in FIG. 7A, the rate of hydrolysis equals to the rate of the formation of product D, which can be expressed by Equation (1):

$$r(\text{hydrolysis}) = \frac{d[D]}{dt} = k_2[B][H_2O] \quad (1)$$

Since the isocyanate B is a dissociative intermediate with very low concentration, a steady-state approximation expressed as Equation (2) is thus deduced:

$$k_2[B][H_2O] + k_1[B][C] = k_{-1}[A] \quad (2)$$

As $K_{eq} = k_1/k_{-1}$, Equation (3) can thus be deduced from Equation (1) and (2):

$$r(\text{hydrolysis}) = \frac{k_2[A][H_2O]}{K_{eq}[C] + \frac{k_2}{k_{-2}}[H_2O]} \quad (3)$$

Figure 7B:
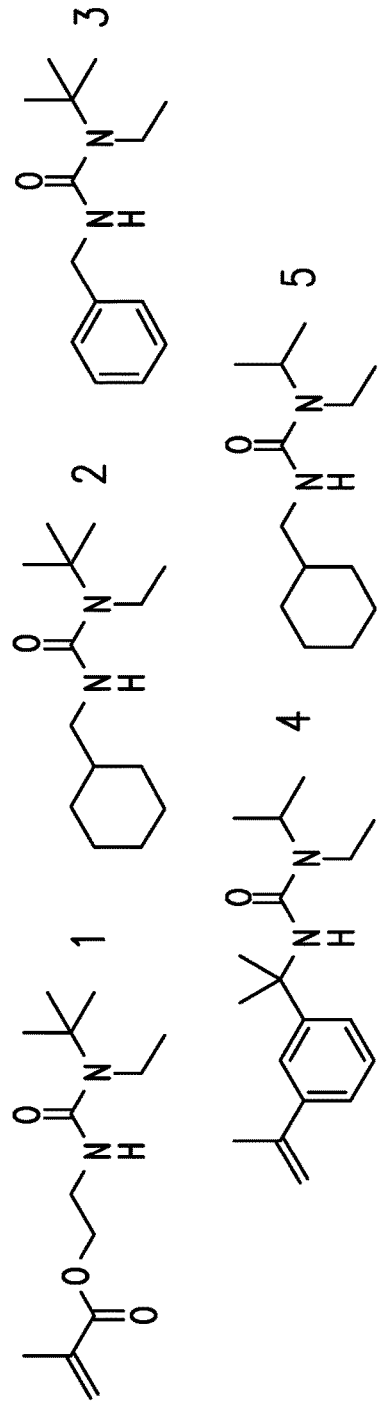

According to Equation 3, the hydrolysis kinetics is related to both $K_{eq}$ and $k_{-1}$, with smaller $K_{eq}$ and larger $k_{-1}$ giving faster hydrolysis. This is consistent with the notion that more dynamic HUBs (more bulky N-substituents) give faster hydrolytic degradation. To confirm this, we analyzed the dynamic parameters[18] and the hydrolysis kinetics of five different HUB-containing model compounds (1-5, See FIG. 7B) with their dynamicity and hydrolytic degradation parameters summarized in FIG. 7C. All five compounds were synthesized by mixing the corresponding isocyanates and amines at 1:1 molar ratio. Compounds 1-3 have similar bulkiness, which are all based on 1,1-tert-butylethylurea (TBEU, $R_3$=tert-butyl) structure. They show nearly identical $k_{-1}$. Compounds 4 and 5 have less bulky 1-iso-propyl-1-ethylurea (IPEU, $R_3$=iso-propyl) structure, which show lower dynamicity than 1-3 (higher $K_{eq}$ and lower $k_{-1}$). For these two IPEU based compounds, 4 shows higher dynamicity than 5 with lower $K_{eq}$ and higher $k_{-1}$ due to its more bulky isocyanate structure (more bulky $R_1$ and $R_2$).

Figure 7D:
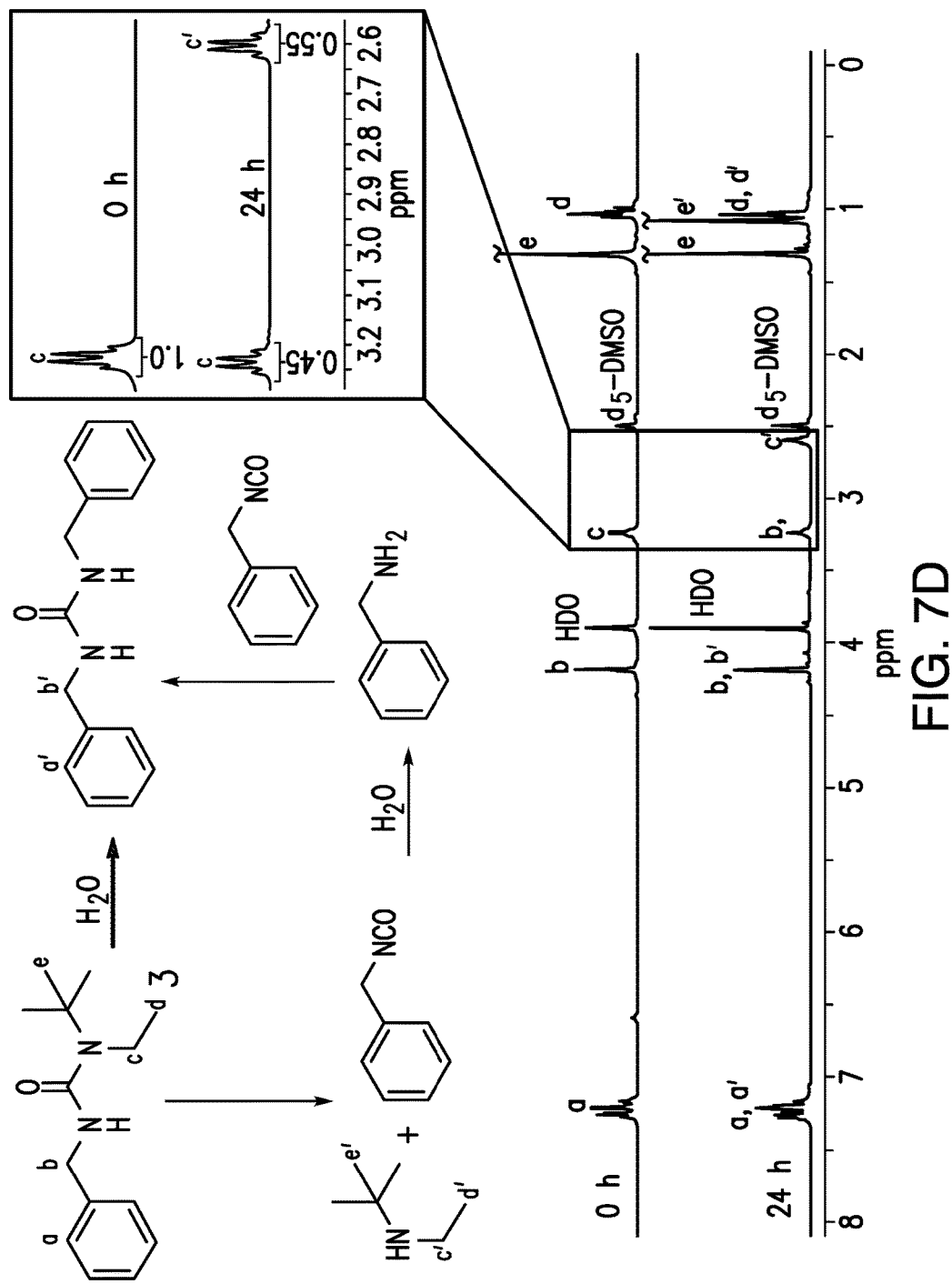

We went on to analyze the hydrolytic degradation profiles of 1-5 by $^1$H NMR (obtained on a Varian 500 MHz spectrometer). The compounds were dissolved in a mixture of $d_6$-DMSO and $D_2O$ (v($d_6$-DMSO)/v($D_2O$)=5:1). The percentage of the hydrolyzed products was analyzed after the mixture was incubated for 24 h at 37° C. (See FIG. 7D; the hydrolytic degradation of 3 is shown as an example). All three TBEU based compounds (1-3) showed over 50% of hydrolytic degradation of their urea bonds, with 2 showing the fastest degradation (85%) due to its lowest $K_{eq}$. Compound 4, bearing less bulky (less dynamic) IPEU structure, showed slower hydrolytic degradation (~10%) compared to 1-3. No detectable hydrolysis was observed for compound 5 because of its least substituent bulkiness (lowest dynamicity, FIG. 7C). These results are consistent with the conclusions drawn from Equation 3.

Figure 8A:
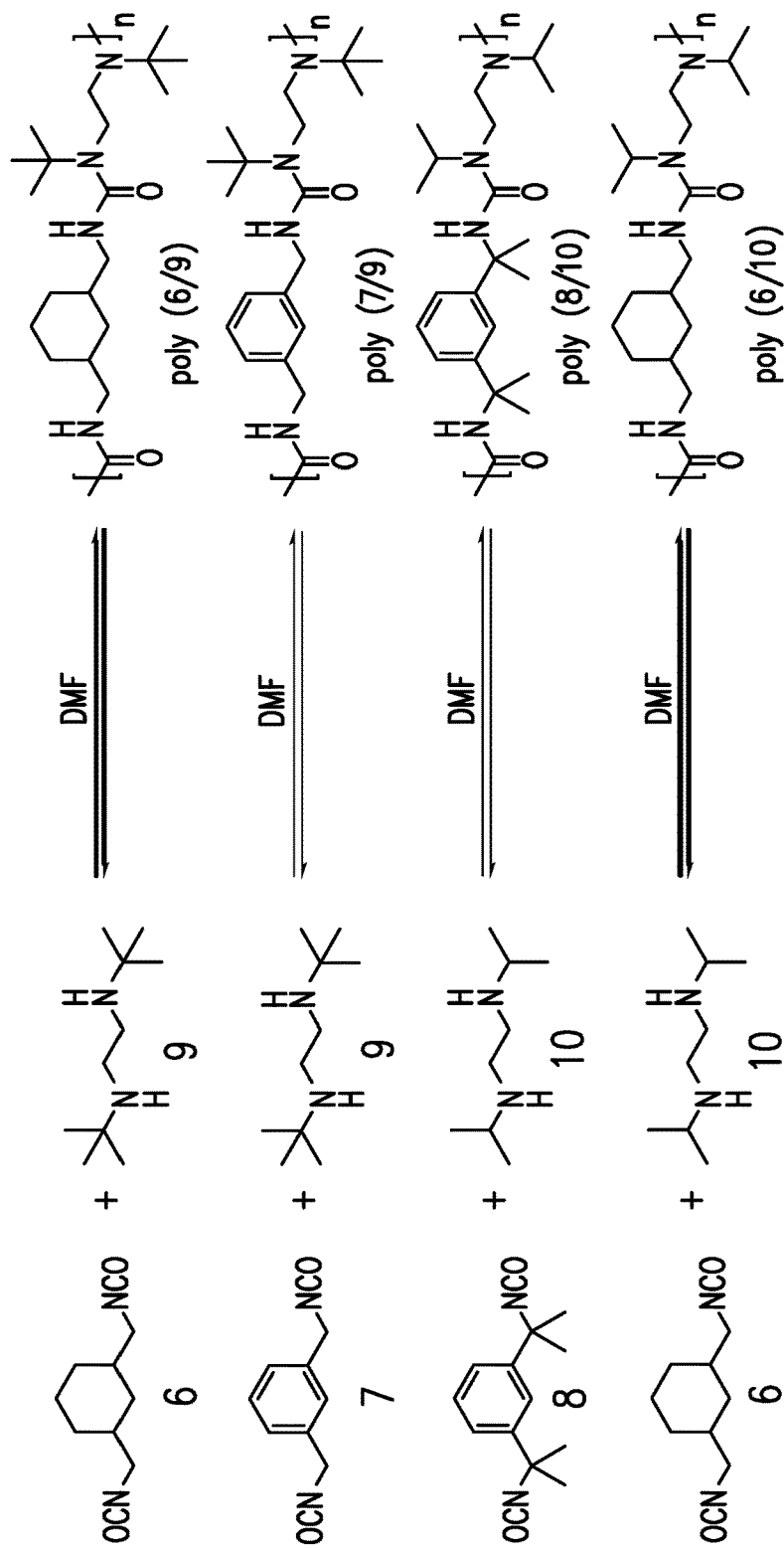
FIGS. 8A through 8C depict the water degradation of HUB based linear polymers (pHUBs), or polymeric HUBs.
Figure 8C:
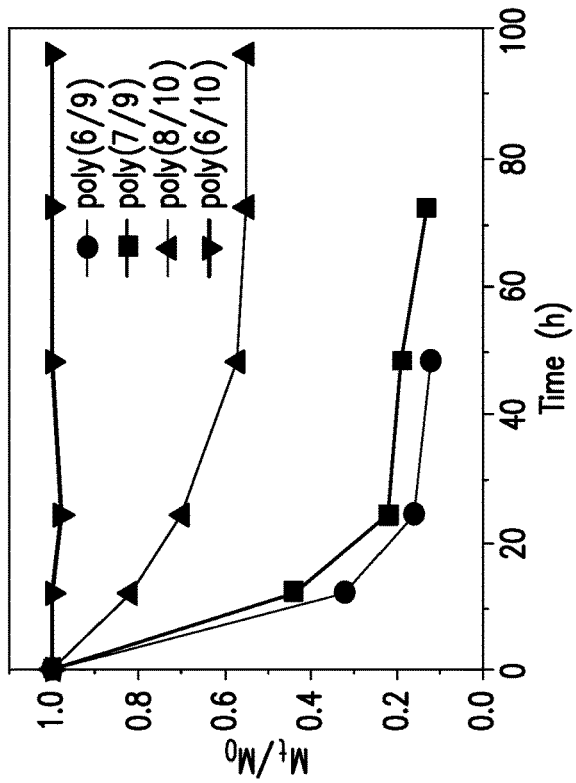
Figure 8B:
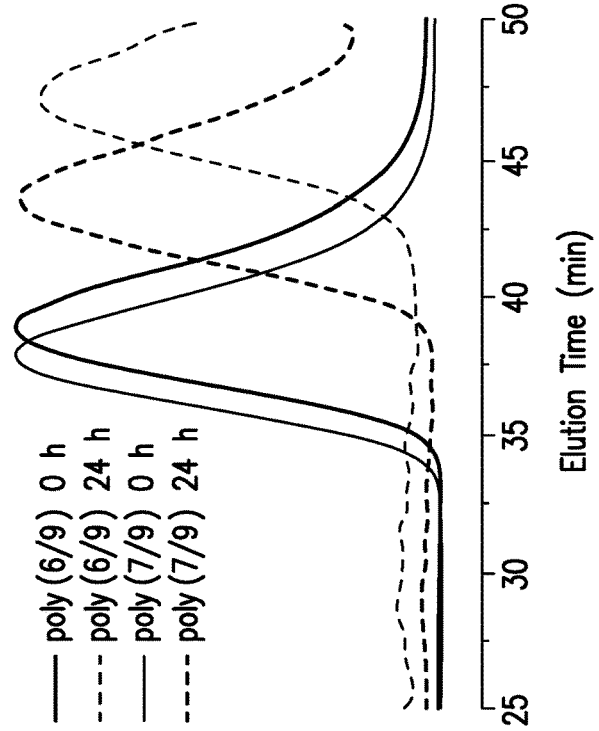

We next examined if polymers bearing HUBs (pHUBs) could also be degraded by water. Linear pHUBs were synthesized by mixing diisocyanates and diamines at a 1:1 molar ratio in DMF. Although the bulky substituents in HUBs destabilize the urea bond, the HUBs still have sufficiently large binding constants ($K_{eq}$ ~10$^5$, see FIG. 4C) to form high molecular weight polymers. Poly(6/9), poly(7/9), poly(8/10), and poly(6/10), four different pHUBs with descending dynamicity, were prepared by mixing the corresponding diisocyanate (1,3-bis(isocyanatomethyl)cyclohexane (6), 1,3-bis(isocyanatomethyl)benzene (7) or 1,3-bis(1-isocyanato-1-methylethyl)benzene (8)) and diamine (N,N'-di-tert-butylethylenediamine (9) or N,N'-di-iso-propylethylenediamine (10)). The HUB structure of poly(6/9), poly(7/9), poly(8/10) and poly(6/10) resembles the corresponding model compounds 2-5 (FIG. 8A). The $M_n$'s of these four polymers were 22, 22, 44 and 120 KDa, as characterized by gel permeation chromatography (GPC), and showed correlation with their $K_{eq}$'s. To study the hydrolytic degradation of these pHUBs, 5% of water was added to the DMF solutions of each polymer. These solutions were vigorously stirred and incubated at 37° C., and the molecular weights were monitored by GPC at selected time. MW decrease was observed for TBEU based poly(6/9) and poly(7/9) (FIG. 8B). For IPEU based polymers, poly(8/10) showed limited degradation, while poly(6/10) barely showed any change of its $M_n$ after 24 h (FIG. 8C). After incubation for 48 h, the percentages of MW reduction for poly(6/9), poly(7/9) and poly(8/10) were 88%, 81% and 43%, respectively. The MW of poly(8/10) did not further decrease for elongated incubation (FIG. 8C), which could be attributed to the increase of free amine concentration that inhibits degradation (see Equation 3, larger [C] gives lower degradation rate). The alteration of polymer hydrolysis kinetics with the change of HUB bulkiness was consistent with the results derived from the study of small molecular model compounds 1-5.

Figure 9A:
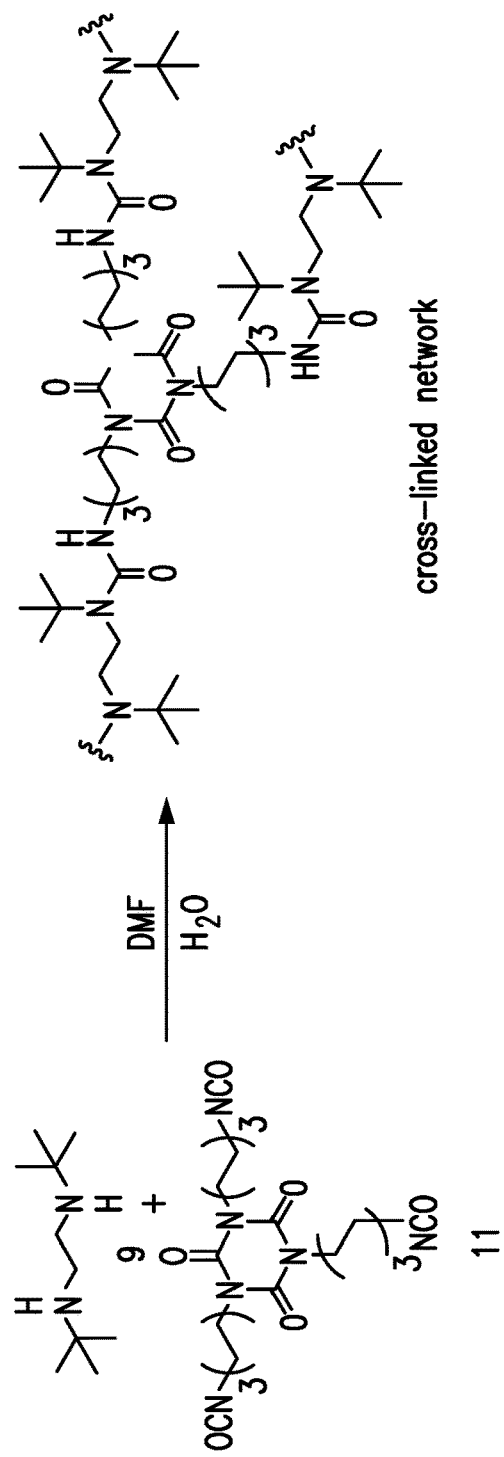
FIGS. 9A through 9C depict the water degradation of HUB based cross-linked polymers (pHUBs).
Figure 9B:
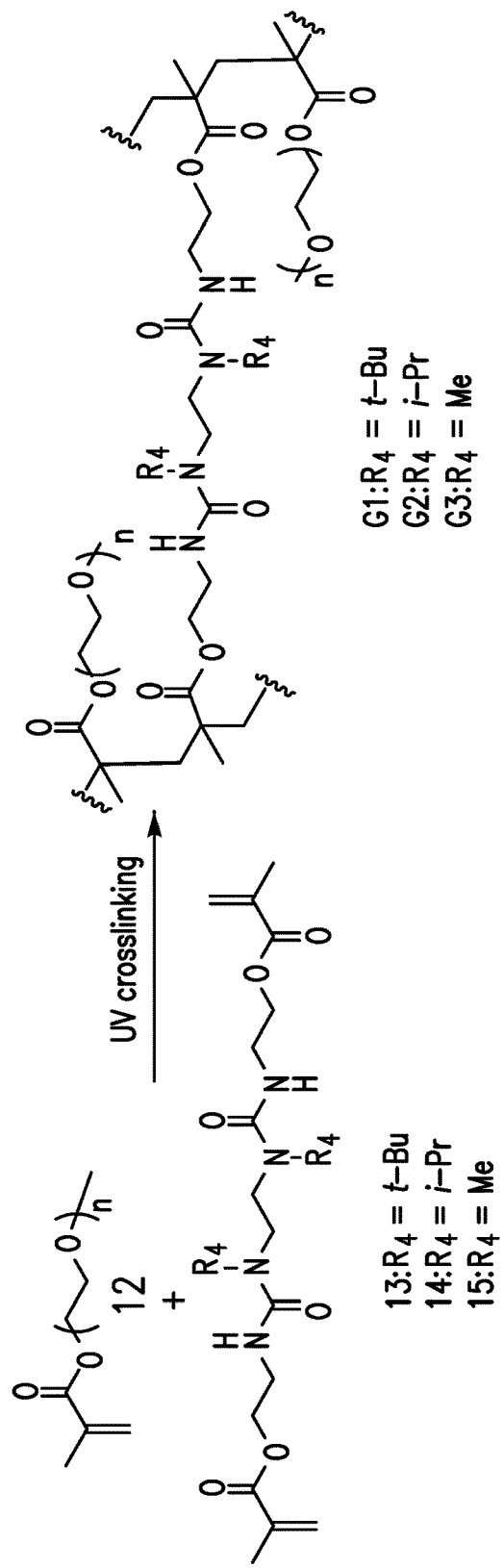
Figure 9C:
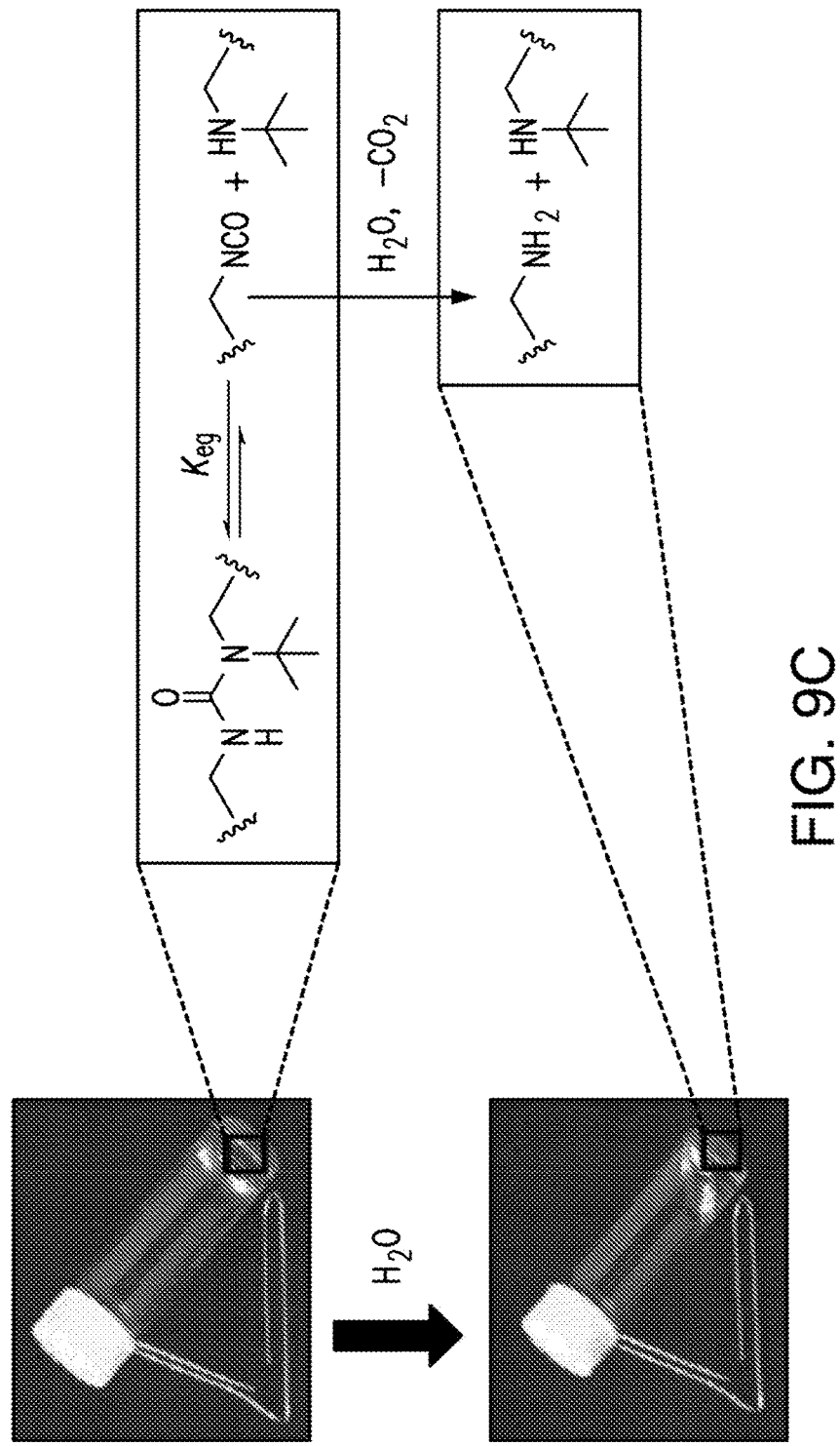
Figure 10A:
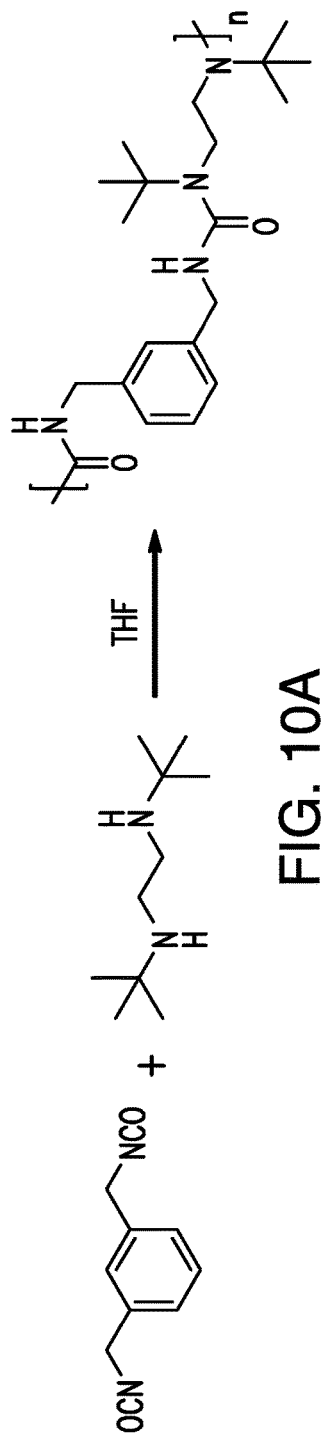
FIGS. 10A through 10C depict the reversible tuning of the polymer size by changing the solution concentration of the precursor materials.
Figure 10C:
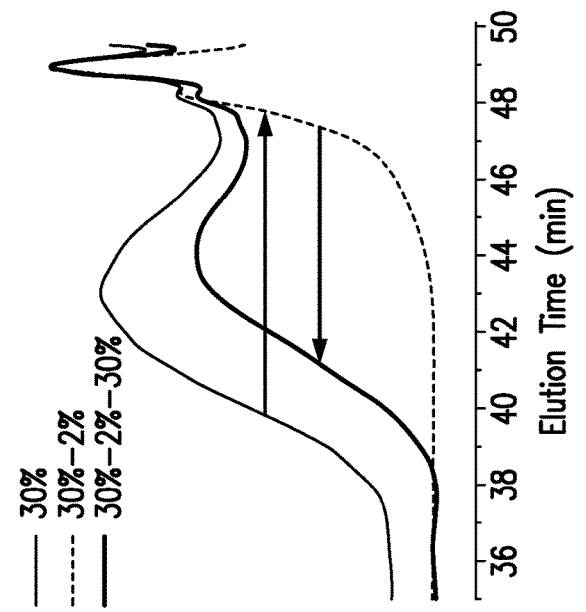
Figure 10B:
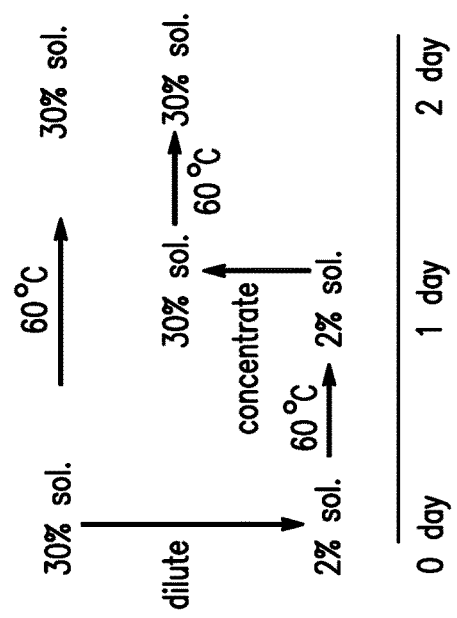
Figures 11A, 11B:
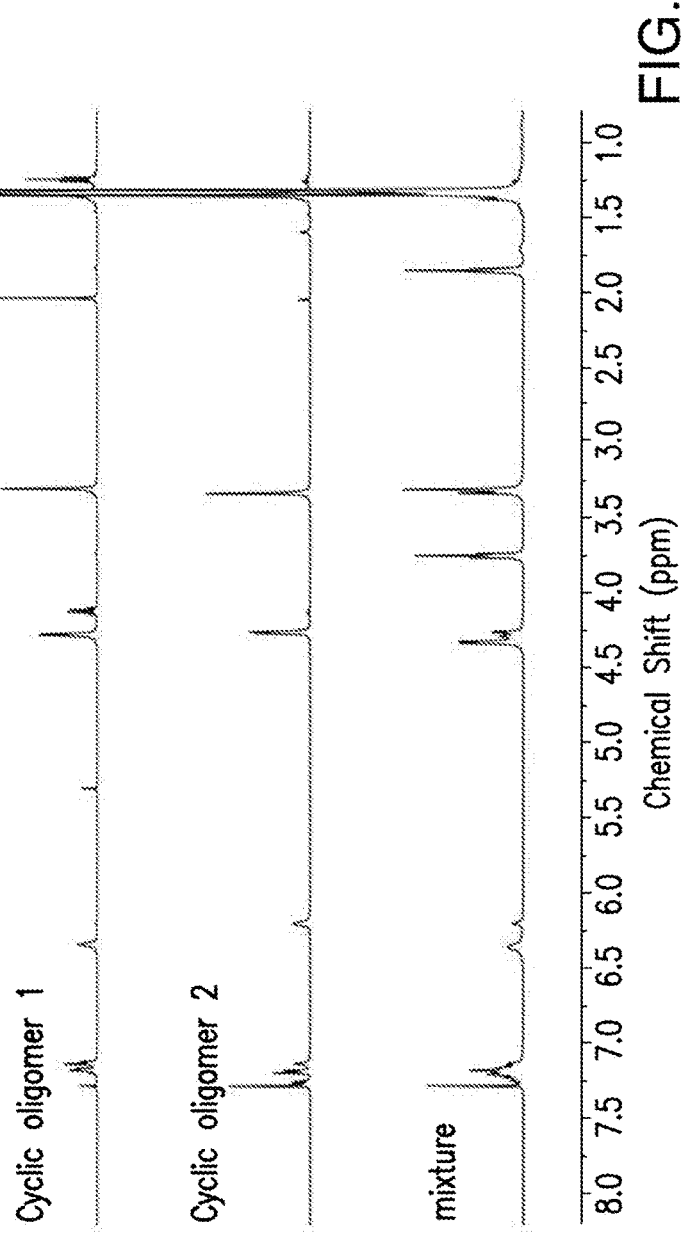
FIGS. 11A through 11C depict the structure identification of cyclic oligomeric species.
Figure 11C:
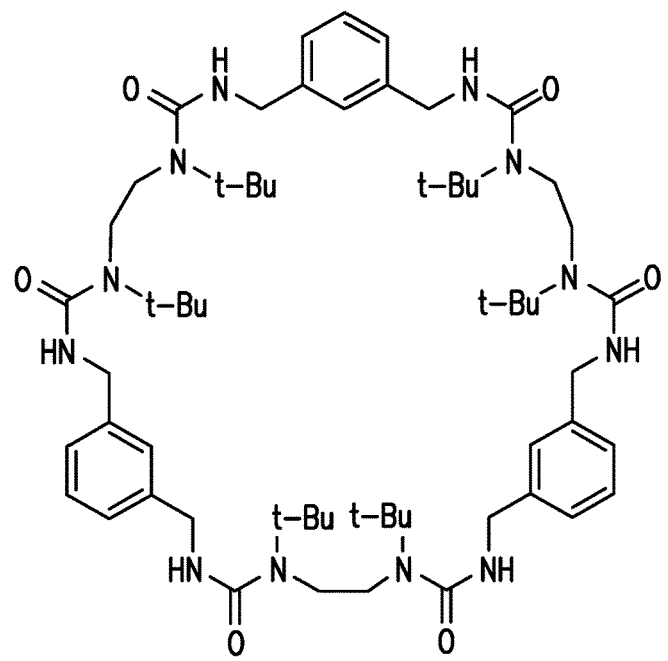
Figure 11C:
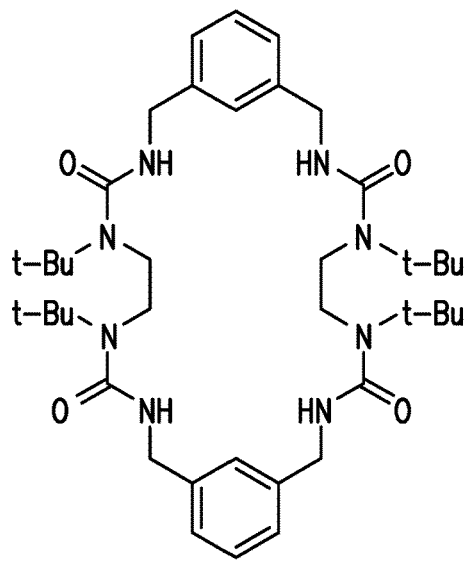

To further demonstrate the hydrolytic degradation of TBEU based polymer, we prepared a cross-linked organogel by mixing tri-isocyanate 11 with diamine 9 in DMF containing 5% water. Because isocyanate reacts with amine much faster than with water, 9 and 11 first reacted to form polyurea gel. The added water slowly hydrolyzed the TBEU bond, which led to the collapse of the gel after the gel was incubated 24 h at 37° C. (FIGS. 9A and 9C).

To study pHUBs degradation in aqueous solution and explore the potential of pHUBs for biomaterials applications, we designed hydrophilic polymers bearing HUB cross-linkers. To poly(ethylene glycol) methyl ether methacrylate monomer ($M_n$~500), we added HUB containing dimethacrylate 13-14 as cross-linkers and Irgacure 2959 as the photoinitiator. The HUBs structures in 13-14 are TBEU and IPEU, respectively. The mixtures were irradiated by UV light (365 nm) to prepare the cross-linked polymers G1, G2, and G3. (FIG. 9B). We first did dynamic exchange studies of G1, G2, and G3 by immersing them in DMF in the presence or absence of hexylamine. In the absence of hexylamine, all three gels swelled, demonstrating they are cross-linked polymers. In the presence of hexylamine, only G1 was dissolved while G2 and G3 stayed intact. This experiment demonstrated that TBEU-containing G1 has much faster dynamic exchange than G2 or G3, which is the requisite for efficient water degradation. For the water degradation study, we immersed G1, G2 and G3 into phosphate buffered saline (PBS) and monitored the weight change at various time with the incubation at 37° C. (gels were pre-treated with deionized water with short time to remove all the unreacted monomers).[2d] The weights of G2 and G3 remained nearly unchanged after incubation for 9 days. In contrast, G1 showed a consistent weight decrease and completely disappeared after incubation for 4 days (FIG. 9B). We should notice that the degradation of TBEU might give a stable urea as the product since the amine from hydrolysis of isocyanate might react with another isocyanate molecule (as shown in the example in FIG. 4D), which will hold the network without complete degradation. However, we observed complete degradation of G1 in PBS, which meant that the formation of stable urea rarely happened in this case. Several reasons might explain the reduced probability of urea coupling: i) much higher water concentration in pure water environment than organic solvent environment; ii) protonation of amine groups in buffered neutral pH reduces reactivity; iii) amine groups are embedded by long oligoethylene glycol chains, which block their reaction of the exposed isocyanate.

In conclusion, we demonstrated the potential of HUBs for the design of water degradable polymeric materials. Kinetic analyses of small molecule model compounds prove that more bulky HUBs lead to faster water degradations. The same trend applies to the polymeric materials, with TBEU as one of the HUBs having the appropriate bulkiness for both sufficient binding stability for polymer formation and efficient dynamicity for water degradation. TBEU based linear polymers degrades to 10%~20% of their original size within 2 days. TBEU is also incorporated into cross-linked hydrogel materials which render complete water dissolution of the hydrogel within 4 days, making pHUBs alternative building blocks of hydrolysable hydrogels. pHUBs provide a great new platform for the engineering of hydrolysable materials. Firstly, the degradation kinetics could be directly controlled by substituents bulkiness. While we have demonstrated the use of TBEU for water degradable materials within days under mild conditions, less bulky urea might be used for applications which need longer lasting time or harsher degradation conditions (such as poly(8/10) or its derivatives). Secondly, different from traditional hydrolysable polymers, pHUBs could be synthesized by simple mixing amine and isocyanate precursors at ambient condition with no catalyst and with no further purification needed, and with no byproducts generated, which makes it possible for end-users to control the copolymer composition for specific uses without the need of a complicated synthetic apparatus. Additionally, a large number of isocyanate monomers have been developed for use in the polyurethane and polyurea plastic industry, which can be used to react with amines with N-bulky substituents to give a very large library of hydrolysable polymers with versatile structures and functions.

REFERENCES FOR EXAMPLE 4

(1) (a) Petros, R. A.; DeSimone, J. M. *Nat. Rev. Drug Discov.* 2010, 9, 615-627. (b) Duncan, R. *Nat. Rev. Cancer* 2006, 6, 688-701. (c) Tong, R.; Cheng, J. J. *Polymer Reviews* 2007, 47, 345-381. (d) Yin, Q.; Tong, R.; Yin, L. C.; Fan, T. M.; Cheng, J. J. *Polym. Chem.* 2014, 5, 1581-1585.

(2) (a) Langer, R.; Vacanti, J. P. *Science* 1993, 260, 920-926. (b) Sun, H. L.; Meng, F. H.; Dias, A. A.; Hendriks, M.; Feijen, J.; Zhong, Z. Y. *Biomacromolecules* 2011, 12, 1937-1955. (c) Annabi, N.; Tamayol, A.; Uquillas, J. A.; Akbari, M.; Bertassoni, L. E.; Cha, C.; Camci-Unal, G.; Dokmeci, M. R.; Peppas, N. A.; Khademhosseini, A. *Adv. Mater.* 2014, 26, 85-124. (d) Wang, Y. D.; Ameer, G. A.; Sheppard, B. J.; Langer, R. *Nat. Biotechnol.* 2002, 20, 602-606.

(3) (a) Ulery, B. D.; Nair, L. S.; Laurencin, C. T. *J. Polym. Sci., Part B: Polym. Phys.* 2011, 49, 832-864. (b) Lendlein, A.; Langer, R. *Science* 2002, 296, 1673-1676

(4) (a) Hwang, S. W.; Tao, H.; Kim, D. H.; Cheng, H. Y.; Song, J. K.; Rill, E.; Brenckle, M. A.; Panilaitis, B.; Won, S. M.; Kim, Y. S.; Song, Y. M.; Yu, K. J.; Ameen, A.; Li, R.; Su, Y. W.; Yang, M. M.; Kaplan, D. L.; Zakin, M. R.; Slepian, M. J.; Huang, Y. G.; Omenetto, F. G.; Rogers, J. A. *Science* 2012, 337, 1640-1644. (b) Hwang, S. W.; Park, G.; Cheng, H.; Song, J. K.; Kang, S. K.; Yin, L.; Kim, J. H.; Omenetto, F. G.; Huang, Y. G.; Lee, K. M.; Rogers, J. A. *Adv. Mater.* 2014, 26, 1992-2000.

(5) (a) Gross, R. A.; Kalra, B. *Science* 2002, 297, 803-807. (b) Tharanathan, R. N. *Trends Food Sci. Technol.* 2003, 14, 71-78.

(6) (a) Nampoothiri, K. M.; Nair, N. R.; John, R. P. *Bioresour. Technol.* 2010, 101, 8493-8501. (b) Tong, R.; Cheng, J. J. *Angew. Chem. Int. Ed.* 2008, 47, 4830-4834. (c) Yoshimoto, H.; Shin, Y. M.; Terai, H.; Vacanti, J. P. *Biomaterials* 2003, 24, 2077-2082. (d) Samarajeewa, S.; Shrestha, R.; Li, Y. L.; Wooley, K. L. *J. Am. Chem. Soc.* 2012, 134, 1235-1242. (e) Almutairi, A.; Rossin, R.; Shokeen, M.; Hagooly, A.; Ananth, A.; Capoccia, B.; Guillaudeu, S.; Abendschein, D.; Anderson, C. J.; Welch, M. J.; Frechet, J. M. J. *Proc. Natl. Acad. Sci. USA* 2009, 106, 685-690

(7) (a) Yin, L.; Huang, X.; Xu, H. X.; Zhang, Y. F.; Lam, J.; Cheng, J. J.; Rogers, J. A. *Adv. Mater.* 2014, 26, 3879-3884. (b) Rutherglen, B. G.; McBath, R. A.; Huang, Y. L.; Shipp, D. A. *Macromolecules* 2010, 43, 10297-10303.

(8) (a) Heller, J.; Barr, J.; Ng, S. Y.; Abdellauoi, K. S.; Gurny, R. *Adv. Drug Del. Rev.* 2002, 54, 1015-1039. (b) Du, F. S.; Huang, X. N.; Chen, G. T.; Lin, S. S.; Liang, D. H.; Li, Z. C. *Macromolecules* 2010, 43, 2474-2483.

(9) (a) Binauld, S.; Stenzel, M. H. *Chem. Commun.* 2013, 49, 2082-2102. (b) Liu, R.; Zhang, Y.; Zhao, X.; Agarwal, A.; Mueller, L. J.; Feng, P. Y. *J. Am. Chem. Soc.* 2010, 132, 1500-1501.

(10) (a) Shenoi, R. A.; Narayanannair, J. K.; Hamilton, J. L.; Lai, B. F. L.; Horte, S.; Kainthan, R. K.; Varghese, J. P.; Rajeev, K. G.; Manoharan, M.; Kizhakkedathu, J. N. *J. Am. Chem. Soc.* 2012, 134, 14945-14957. (b) Zhang, Y. F.; Wang, R.; Hua, Y. Y.; Baumgartner, R.; Cheng, J. J. *ACS Macro Lett.* 2014, 3, 693-697. (c) Broaders, K. E.; Pastine, S. J.; Grandhe, S.; Frechet, J. M. J. *Chem. Commun.* 2011, 47, 665-667.

(11) Garcia, J. M.; Jones, G. O.; Virwani, K.; McCloskey, B. D.; Boday, D. J.; ter Huurne, G. M.; Horn, H. W.; Coady, D. J.; Bintaleb, A. M.; Alabdulrahman, A. M. S.; Alsewailem, F.; Almegren, H. A. A.; Hedrick, J. L. *Science* 2014, 344, 732-735.

(12) Fishman, J. M.; Kiessling, L. L. *Angew. Chem. Int. Ed.* 2013, 52, 5061-5064

(13) (a) Kim, Y. H.; Park, J. H.; Lee, M.; Kim, Y. H.; Park, T. G.; Kim, S. W. J. *Controlled Release* 2005, 103, 209-219. (b) Zhao, Y. L.; Li, Z. X.; Kabehie, S.; Botros, Y. Y.; Stoddart, J. F.; Zink, J. I. *J. Am. Chem. Soc.* 2010, 132, 13016-13025. (c) Xu, X. W.; Flores, J. D.; McCormick, C. L. *Macromolecules* 2011, 44, 1327-1334.

(14) (a) Xiong, M. H.; Bao, Y.; Yang, X. Z.; Wang, Y. C.; Sun, B. L.; Wang, J. *J. Am. Chem. Soc.* 2012, 134, 4355-4362. (b) Zhang, S. Y.; Zou, J.; Zhang, F. W.; Elsabahy, M.; Felder, S. E.; Zhu, J. H.; Pochan, D. J.; Wooley, K. L. *J. Am. Chem. Soc.* 2012, 134, 18467-18474.

(15) (a) Deng, M.; Kumbar, S. G.; Nair, L. S.; Weikel, A. L.; Allcock, H. R.; Laurencin, C. T. *Adv. Funct. Mater.* 2011, 21, 2641-2651. (b) Park, M. R.; Chun, C. J.; Ahn, S. W.; Ki, M. H.; Cho, C. S.; Song, S. C. *J. Controlled Release* 2010, 147, 359-367.

(16) Ajellal, N.; Carpentier, J. F.; Guillaume, C.; Guillaume, S. M.; Helou, M.; Poirier, V.; Sarazin, Y.; Trifonov, A. *Dalton Trans.* 2010, 39, 8363-8376.

(17) (a) Grover, A. K.; Kapoor, M. *Can. J. Biochem.* 1973, 51, 363-378. (b) Hutchby, M.; Houlden, C. E.; Ford, J. G.; Tyler, S. N. G.; Gagne, M. R.; Lloyd-Jones, G. C.; Booker-Milburn, K. I. *Angew. Chem. Int. Ed.* 2009, 48, 8721-8724

(18) Ying, H. Z.; Zhang, Y. F.; Cheng, J. J. *Nat. Commun.* 2014, 5:3218.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

EQUIVALENTS

The invention can be embodied in other specific forms without departing from the spirit or essential characteristics thereof. The foregoing embodiments are to be considered in all respects illustrative rather than limiting on the invention described herein. In the various embodiments of the methods and systems of the present invention, where the term comprises is used with respect to the recited steps or components, it is also contemplated that the methods and systems consist essentially of, or consist of, the recited steps or components. Further, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

All percentages and ratios used herein, unless otherwise indicated, are by weight. Also, throughout the disclosure the term "weight" is used. It is recognized the mass of an object is often referred to as its weight in everyday usage and for most common scientific purposes, but that mass technically refers to the amount of matter of an object, whereas weight refers to the force experienced by an object due to gravity. Also, in common usage the "weight" (mass) of an object is what one determines when one "weighs" (masses) an object on a scale or balance.

What is claimed is:

1. A cyclic oligomer or polymer corresponding to formula (Ia) or (Ib)

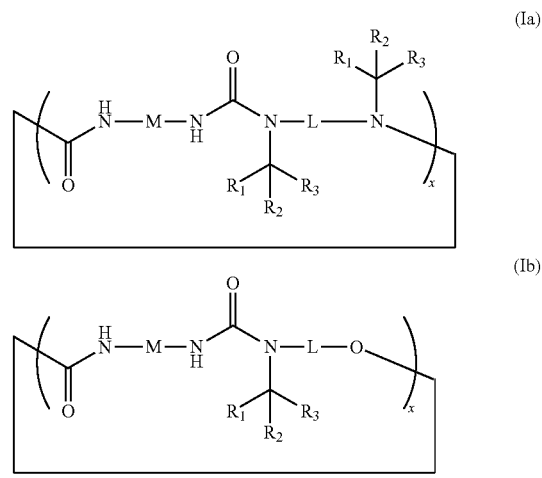

wherein L and M are independently selected from aryl, $(C_1-C_{20})$alkyl, $(C_4-C_{10})$cycloalkyl, $(C_1-C_{20})$alkyl$(C_4-C_{10})$cycloalkyl, $(C_1-C_{20})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —NR$_4$—, =N—, —C(R$_5$)$_2$—, —NC(=O)(C$_1$-C$_{20}$)alkyl-, —C(=O)(C$_1$-C$_{20}$)alkyl-, —C(=O)—(NR$_4$)—, —S(=O)$_2$O—, —S(=O)$_2$—(C$_1$-C$_{20}$)alkyl-, —OS(=O)$_2$O(C$_1$-C$_{20}$)alkyl-, —S(=O)$_2$NR$_4$—, —S(=O)(C$_1$-C$_{20}$)alkyl-, —P(=O)(OR$_4$)O—, —C(S)—(C$_1$-C$_{20}$)alkyl-, —C(O)O(C$_1$-C$_{20}$)alkyl-, —C(=O)O—, —C(=S)O(C$_1$-C$_{20}$)alkyl-, —C(=O)S(C$_1$-C$_{20}$)alkyl-, —C(=S)S(C$_1$-C$_{20}$)alkyl-, —C(O)NR$_4$—(C$_1$-C$_{20}$)alkyl-, and —C(=NR$_4$)NR$_4$—;

each R$_1$, R$_2$, R$_3$ and R$_4$ are independently selected from the group consisting of aryl, (C$_1$-C$_{20}$)alkyl, (C$_4$-C$_{10}$)cycloalkyl, (C$_1$-C$_{20}$)alkyl(C$_4$-C$_{10}$)cycloalkyl, (C$_1$-C$_{20}$)alkyl(C$_4$-C$_{10}$)cycloalkyl(C$_1$-C$_{20}$)alkyl, (C$_2$-C$_{20}$)alkyl-PEG-(C$_2$-C$_{20}$)alkyl, and H;

each R$_5$ is independently selected from F, Cl, Br, and I; and x is an integer from about 2 to about 500.

2. A cyclic oligomer or polymer according to claim 1 wherein R$_1$, R$_2$, and R$_3$ are each methyl.

3. A cyclic oligomer or polymer according to claim 1 wherein M is

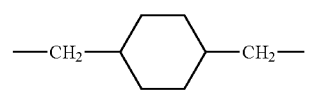

and L is —(CH$_2$CH$_2$)—.

4. A cyclic oligomer or polymer according to claim 1 wherein x is an integer from about 2 to about 50.

5. A hyperbranched cyclic oligomer or polymer corresponding to formula (IIa) or (IIb)

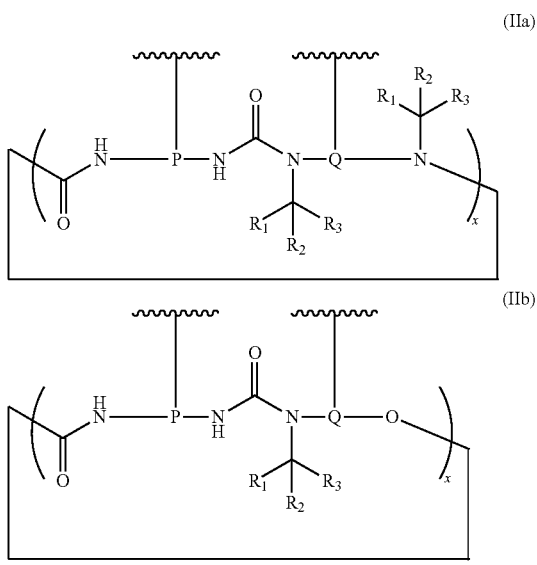

wherein P and Q are independently selected from functionalized branched linkers each having a total of three or more arms selected from aryl, $(C_1-C_{20})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, and $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —NR$_4$—, =N—, —C(R$_5$)$_2$—, —NC(=O)(C$_1$-C$_{20}$)alkyl-, —C(=O)(C$_1$-C$_{20}$)alkyl-, —C(=O)—(NR$_4$)—, —S(=O)$_2$O—, —S(=O)$_2$—(C$_1$-C$_{20}$)alkyl-, —OS(=O)$_2$O(C$_1$-C$_{20}$)alkyl-, —S(=O)$_2$NR$_4$—, —S(=O)(C$_1$-C$_{20}$)alkyl-, —P(=O)(OR$_4$)O—, —C(S)—(C$_1$-C$_{20}$)alkyl-, —C(O)O(C$_1$-C$_{20}$)alkyl-, —C(=O)O—, —C(=S)O(C$_1$-C$_{20}$)alkyl-, —C(=O)S(C$_1$-C$_{20}$)alkyl-, —C(=S)S(C$_1$-C$_{20}$)alkyl-, —C(O)NR$_4$—(C$_1$-C$_{20}$)alkyl-, and —C(=NR$_4$)NR$_4$—;

each R$_1$, R$_2$, R$_3$ and R$_4$ are independently selected from the group consisting of aryl, $(C_1-C_{20})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;

each R$_5$ is independently selected from F, Cl, Br, and I; and x is an integer from about 2 to about 500.

6. A hyperbranched cyclic oligomer or polymer according to claim 5 wherein R$_1$, R$_2$, and R$_3$ are each methyl.

7. A hyperbranched cyclic oligomer or polymer according to claim 5 wherein x is an integer from about 2 to about 50.

8. A cyclic oligomer or polymer comprising two or more hindered urea bond functional groups,
wherein the hindered urea bond functional groups correspond to formula (IIIa) or (IIIb)

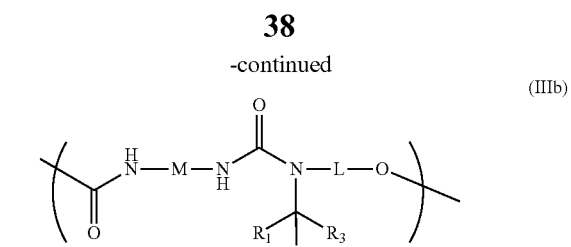

wherein L and M are independently selected from aryl, $(C_1-C_{20})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, and $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —NR$_4$—, =N—, —C(R$_5$)$_2$—, —NC(=O)(C$_1$-C$_{20}$)alkyl-, —C(=O)(C$_1$-C$_{20}$)alkyl-, —C(=O)—(NR$_4$)—, —S(=O)$_2$O—, —S(=O)$_2$—(C$_1$-C$_{20}$)alkyl-, —OS(=O)$_2$O(C$_1$-C$_{20}$)alkyl-, —S(=O)$_2$NR$_4$—, —S(=O)(C$_1$-C$_{20}$)alkyl-, —P(=O)(OR$_4$)O—, —C(S)—(C$_1$-C$_{20}$)alkyl-, —C(O)O(C$_1$-C$_{20}$)alkyl-, —C(=O)O—, —C(=S)O(C$_1$-C$_{20}$)alkyl-, —C(=O)S(C$_1$-C$_{20}$)alkyl-, —C(=S)S(C$_1$-C$_{20}$)alkyl-, —C(O)NR$_4$—(C$_1$-C$_{20}$)alkyl-, and —C(=NR$_4$)NR$_4$—;

each R$_1$, R$_2$, R$_3$ and R$_4$ are independently selected from the group consisting of aryl, $(C_1-C_{20})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;

and each R$_5$ is independently selected from F, Cl, Br, and I.

9. A cyclic oligomer or polymer according to claim 8 comprising from about 2 to about 500 hindered urea bond functional groups.

10. A cyclic oligomer or polymer according to claim 8 wherein R$_1$, R$_2$, and R$_3$ are each methyl.

11. A cyclic oligomer or polymer according to claim 8 wherein M is

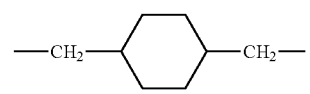

and L is —(CH$_2$CH$_2$)—.

12. A cyclic hyperbranched oligomer or polymer comprising two or more hindered urea bond functional groups,
wherein the hindered urea bond functional groups correspond to formula (IVa) or (IVb)

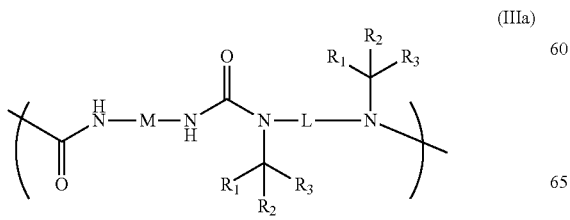

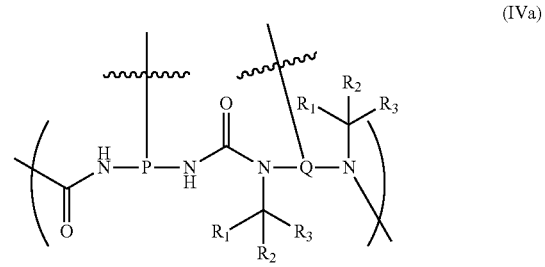

-continued

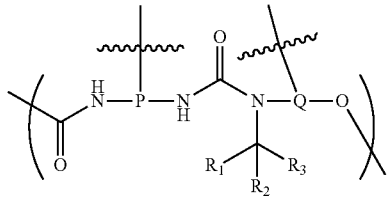
(IVb)

wherein P and Q are independently selected from functionalized branched linkers each having a total of three or more arms selected from aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, and $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —NR$_4$—, =N—, —C(R$_5$)$_2$—, —NC(=O)$(C_1-C_{20})$alkyl-, —C(=O)$(C_1-C_{20})$alkyl-, —C(=O)—(NR$_4$)—, —S(=O)$_2$O—, —S(=O)$_2$—$(C_1-C_{20})$alkyl-, —OS(=O)$_2$O$(C_1-C_{20})$alkyl-, —S(=O)$_2$NR$_4$—, —S(=O)$(C_1-C_{20})$alkyl-, —P(=O)(OR$_4$)O—, —C(S)—$(C_1-C_{20})$alkyl-, —C(O)O$(C_1-C_{20})$alkyl-, —C(=O)O—, —C(=S)O$(C_1-C_{20})$alkyl-, —C(=O)S$(C_1-C_{20})$alkyl-, —C(=S)S$(C_1-C_{20})$alkyl-, —C(O)NR$_4$—$(C_1-C_{20})$alkyl-, and —C(=NR$_4$)NR$_4$—;

each $R_1$, $R_2$, $R_3$ and $R_4$ are independently selected from the group consisting of aryl, $(C_1-C_{20})$alkyl, $(C_4-C_{10})$Cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;

and each $R_5$ is independently selected from F, Cl, Br, and I.

13. A cyclic hyperbranched oligomer or polymer according to claim 12 comprising from about 2 to about 500 hindered urea bond functional groups.

14. A cyclic hyperbranched oligomer or polymer according to claim 12 wherein $R_1$, $R_2$, and $R_3$ are each methyl.

15. A cyclic oligomer or polymer according to claim 1 prepared from reacting a difunctional isocyante according to formula (V)

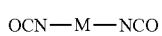
(V)

with a difunctional hindered amine according to formula (VII)

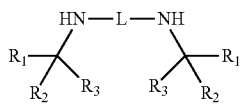
(VII)

wherein L and M are independently selected from aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, and $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —NR$_4$—, =N—, —C(R$_5$)$_2$—, —NC(=O)$(C_1-C_{20})$alkyl-, —C(=O)$(C_1-C_{20})$alkyl-, —C(=O)—(NR$_4$)—, —S(=O)$_2$O—, —S(=O)$_2$—$(C_1-C_{20})$alkyl-, —OS(=O)$_2$O$(C_1-C_{20})$alkyl-, —S(=O)$_2$NR$_4$—, —S(=O)$(C_1-C_{20})$alkyl-, —P(=O)(OR$_4$)O—, —C(S)—$(C_1-C_{20})$alkyl-, —C(O)O$(C_1-C_{20})$alkyl-, —C(=O)O—, —C(=S)O$(C_1-C_{20})$alkyl-, —C(=O)S$(C_1-C_{20})$alkyl-, —C(=S)S$(C_1-C_{20})$alkyl-, —C(O)NR$_4$—$(C_1-C_{20})$alkyl-, and —C(=NR$_4$)NR$_4$—;

each $R_1$, $R_2$, $R_3$ and $R_4$ are independently selected from the group consisting of aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;

and each $R_5$ is independently selected from F, Cl, Br, and I.

16. A cyclic oligomer or polymer according to claim 1 prepared from diluting a linear polyurea corresponding to the formula (IXa) or (IXb)

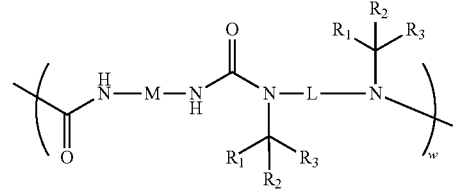
(IXa)

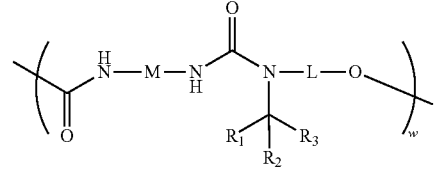
(IXb)

wherein L and M are independently selected from aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, and $(C_2-C_{20})$alkyl-PEG-$(C_2-C_{20})$alkyl, —$(C_1-C_{20})$alkylO$(C_1-C_{20})$alkyl-, —$(C_1-C_{20})$alkylS$(C_1-C_{20})$alkyl-, —NR$_4$—, =N—, —C(R$_5$)$_2$—, —NC(=O)$(C_1-C_{20})$alkyl-, —C(=O)$(C_1-C_{20})$alkyl-, —C(=O)—(NR$_4$)—, —S(=O)$_2$O—, —S(=O)$_2$—$(C_1-C_{20})$alkyl-, —OS(=O)$_2$O$(C_1-C_{20})$alkyl-, —S(=O)$_2$NR$_4$—, —S(=O)$(C_1-C_{20})$alkyl-, —P(=O)(OR$_4$)O—, —C(S)—$(C_1-C_{20})$alkyl-, —C(O)O$(C_1-C_{20})$alkyl-, —C(=O)O—, —C(=S)O$(C_1-C_{20})$alkyl-, —C(=O)S$(C_1-C_{20})$alkyl-, —C(=S)S$(C_1-C_{20})$alkyl-, —C(O)NR$_4$—$(C_1-C_{20})$alkyl-, and —C(=NR$_4$)NR$_4$—;

each $R_1$, $R_2$, $R_3$ and $R_4$ are independently selected from the group consisting of aryl, $(C_1-C_{20})$alkyl, $(C_4-C_{10})$cyclolalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_2-C_{20})$alkyl-PEG-$(C_2-C_{20})$alkyl, and H;

each $R_5$ is independently selected from F, Cl, Br, and I;

and x is an integer from 2 to about $1 \times 10^6$.

17. An elastomer comprising a cyclic oligomer or polymer according to claim 1.

18. A coating comprising a cyclic oligomer or polymer according to claim 1.

19. A cyclic hyperbranched oligomer or polymer according to claim 5 prepared from reacting a polyfunctional isocyante according to formula (VI)

(VI)

wherein y is an integer from about 2 to about 10;

with a polyfunctional hindered amine according to formula (VIII)

(VIII)

wherein z is an integer from about 2 to about 10;

wherein L and M are independently selected from aryl, $(C_1\text{-}C_{20})$alkyl, $(C_4\text{-}C_{10})$cyclolalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, and $(C_2\text{-}C_{20})$alkyl-PEG-$(C_2\text{-}C_{20})$alkyl, —$(C_1\text{-}C_{20})$alkylO$(C_1\text{-}C_{20})$alkyl-, —$(C_1\text{-}C_{20})$alkylS$(C_1\text{-}C_{20})$alkyl-, —NR$_4$—, =N—, —C(R$_5$)$_2$—, —NC(=O)(C$_1$-C$_{20}$)alkyl-, —C(=O)(C$_1$-C$_{20}$)alkyl-, —C(=O)—(NR$_4$)—, —S(=O)$_2$O—, —S(=O)$_2$—(C$_1$-C$_{20}$)alkyl-, —OS(=O)$_2$O(C$_1$-C$_{20}$)alkyl-, —S(=O)$_2$NR$_4$—, —S(=O)(C$_1$-C$_{20}$)alkyl-, —P(=O)(OR$_4$)O—, —C(S)—(C$_1$-C$_{20}$)alkyl-, —C(O)O(C$_1$-C$_{20}$)alkyl-, —C(=O)O—, —C(=S)O(C$_1$-C$_{20}$)alkyl-, —C(=O)S(C$_1$-C$_{20}$)alkyl-, —C(=S)S(C$_1$-C$_{20}$)alkyl-, —C(O)NR$_4$—(C$_1$-C$_{20}$)alkyl-, and —C(=NR$_4$)NR$_4$—;

each R$_1$, R$_2$, R$_3$ and R$_4$ are independently selected from the group consisting of aryl, (C$_1$-C$_{20}$)alkyl, (C$_4$-C$_{10}$)cyclolalkyl, (C$_1$-C$_{20}$)alkyl(C$_4$-C$_{10}$)cycloalkyl, (C$_1$-C$_{20}$)alkyl(C$_4$-C$_{10}$)cycloalkyl(C$_1$-C$_{20}$)alkyl, (C$_2$-C$_{20}$)alkyl-PEG-(C$_2$-C$_{20}$)alkyl, and H;

and each R$_5$ is independently selected from F, Cl, Br, and I.

20. A cylic hyperbranched oligomer or polymer according to claims prepared from diluting a hyperbranched polyurea corresponding to the formula Xa or Xb

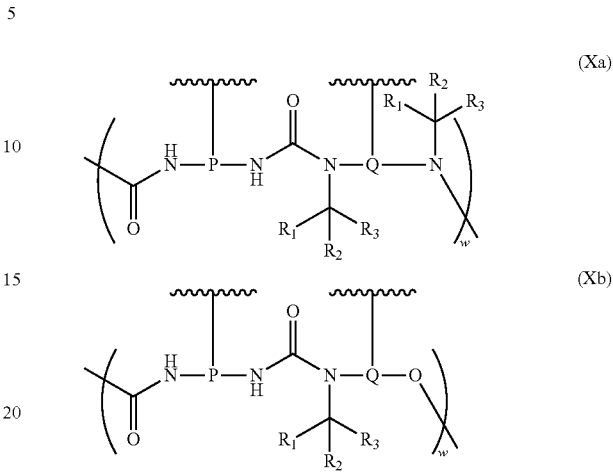

wherein P and Q are independently selected from functionalized branched linkers each having a total of three or more arms selected from aryl, (C$_1$-C$_{20}$)alkyl, (C$_4$-C$_{10}$)cyclolalkyl, (C$_1$-C$_{20}$)alkyl(C$_4$-C$_{10}$)cycloalkyl, (C$_1$-C$_{20}$)alkyl(C$_4$-C$_{10}$)cycloalkyl(C$_1$-C$_{20}$)alkyl, (C$_6$-C$_{10}$)aryl, (C$_1$-C$_{20}$)alkyl(C$_6$-C$_{10}$)aryl, (C$_1$-C$_{20}$)alkyl(C$_6$-C$_{10}$)aryl(C$_1$-C$_{20}$)alkyl, and (C$_2$-C$_{20}$)alkyl-PEG-(C$_2$-C$_{20}$)alkyl, —(C$_1$-C$_{20}$)alkylO(C$_1$-C$_{20}$)alkyl-, —(C$_1$-C$_{20}$)alkylS(C$_1$-C$_{20}$)alkyl-, —NR$_4$—, =N—, —C(R$_5$)$_2$—, —NC(=O)(C$_1$-C$_{20}$)alkyl-, —C(=O)(C$_1$-C$_{20}$)alkyl-, —C(=O)—(NR$_4$)—, —S(=O)$_2$O—, —S(=O)$_2$—(C$_1$-C$_{20}$)alkyl-, —OS(=O)$_2$O(C$_1$-C$_{20}$)alkyl-, —S(=O)$_2$NR$_4$—, —S(=O)(C$_1$-C$_{20}$)alkyl-, —P(=O)(OR$_4$)O—, —C(S)—(C$_1$-C$_{20}$)alkyl-, —C(O)O(C$_1$-C$_{20}$)alkyl-, —C(=O)O—, —C(=S)O(C$_1$-C$_{20}$)alkyl-, —C(=O)S(C$_1$-C$_{20}$)alkyl-, —C(=S)S(C$_1$-C$_{20}$)alkyl-, —C(O)NR$_4$—(C$_1$-C$_{20}$)alkyl-, and —C(=NR$_4$)NR$_4$—;

each R$_1$, R$_2$, R$_3$ and R$_4$ are independently selected from the group consisting of aryl, (C$_1$-C$_{20}$)alkyl, (C$_4$-C$_{10}$)cyclolalkyl, (C$_1$-C$_{20}$)alkyl(C$_4$-C$_{10}$)cycloalkyl, (C$_1$-C$_{20}$)alkyl(C$_4$-C$_{10}$)cycloalkyl(C$_1$-C$_{20}$)alkyl, (C$_2$-C$_{20}$)alkyl-PEG-(C$_2$-C$_{20}$)alkyl, and H;

each R$_5$ is independently selected from F, Cl, Br, and I;

and x is an integer from 2 to about $1 \times 10^6$.

* * * * *